US012625848B2

(12) United States Patent
Moursund et al.

(10) Patent No.: US 12,625,848 B2
(45) Date of Patent: May 12, 2026

(54) MESH NETWORK SYSTEM OF ENVIRONMENTAL MONITORING DEVICES

(71) Applicant: Beckman Coulter, Inc., Brea, CA (US)

(72) Inventors: Carter Movinckel Moursund, Indianapolis, IN (US); Kevin Francis Connors, Indianapolis, IN (US); Louie Doyle Moye, Indianapolis, IN (US); Kenneth Lee Girvin, Indianapolis, IN (US)

(73) Assignee: Beckman Coulter, Inc., Brea, CA (US)

( * ) Notice: Subject to any disclaimer, the term of this patent is extended or adjusted under 35 U.S.C. 154(b) by 0 days.

(21) Appl. No.: 17/922,311

(22) PCT Filed: Apr. 21, 2021

(86) PCT No.: PCT/US2021/028403
§ 371 (c)(1),
(2) Date: Oct. 28, 2022

(87) PCT Pub. No.: WO2021/221976
PCT Pub. Date: Nov. 4, 2021

(65) Prior Publication Data
US 2023/0185775 A1 Jun. 15, 2023

Related U.S. Application Data

(60) Provisional application No. 63/016,824, filed on Apr. 28, 2020.

(51) Int. Cl.
*G06F 16/182* (2019.01)
*H04W 84/18* (2009.01)

(52) U.S. Cl.
CPC ......... *G06F 16/1844* (2019.01); *H04W 84/18* (2013.01)

(58) Field of Classification Search
CPC ........................... G06F 16/1844; H04W 84/18
See application file for complete search history.

(56) References Cited

U.S. PATENT DOCUMENTS 8,160,838 B2    4/2012  Ramin et al.
9,934,242 B2 *  4/2018  Hunt ................... H04L 67/1095
(Continued)

OTHER PUBLICATIONS

International Search Report and Written Opinion, PCT/US2021/028403, Beckman Coulter, Inc. (Jun. 24, 2021).
(Continued)

*Primary Examiner* — Charles Rones
*Assistant Examiner* — Ken Hoang
(74) *Attorney, Agent, or Firm* — Merchant & Gould P.C.

(57) ABSTRACT

Monitoring devices, such as air particle counters, having mesh network capabilities are described for implementation in environmental monitoring within a facility. The air particle counters run samples at various facility locations based on a standard operating procedure (SOP). Each air particle counter can opportunistically connect with one or more other air particle counters using mesh networking. Data from samples run by and any new or updated SOP received at the air particle counters can be distributed via database replication across the other air particle counters using the mesh networking such that each air particle counter has a copy of the sample data and a current SOP within its database. A dashboard user interface displaying a hierarchical representation of the SOP and an associated compliance status with the SOP can be generated and updated based on data received from the air particle counters to facilitate SOP management.

26 Claims, 19 Drawing Sheets

(56)  References Cited

U.S. PATENT DOCUMENTS

| | | | |
|---|---|---|---|
| 2009/0004447 A1* | 1/2009 | Imre | G01N 1/24 |
| | | | 428/212 |
| 2010/0280796 A1 | 11/2010 | Ramin et al. | |
| 2011/0092164 A1* | 4/2011 | Spanhake | H04Q 9/00 |
| | | | 455/67.11 |
| 2015/0379765 A1* | 12/2015 | Gallo | G06T 17/05 |
| | | | 340/525 |
| 2016/0061476 A1* | 3/2016 | Schultz | F24F 11/30 |
| | | | 700/276 |
| 2017/0208493 A1* | 7/2017 | Masson | G08B 21/10 |
| 2019/0293538 A1* | 9/2019 | Paprotny | G01N 15/0606 |
| 2020/0120313 A1* | 4/2020 | LaCroix | H04L 67/5682 |

OTHER PUBLICATIONS

McFarland, "Performance Evaluation of Continuous Air Monitor (CAM) Sampling Heads," Health Physics, vol. 48, No. 3, pp. 275-281 (Mar. 1, 1990).

* cited by examiner

106

122

130

124

120

126

128

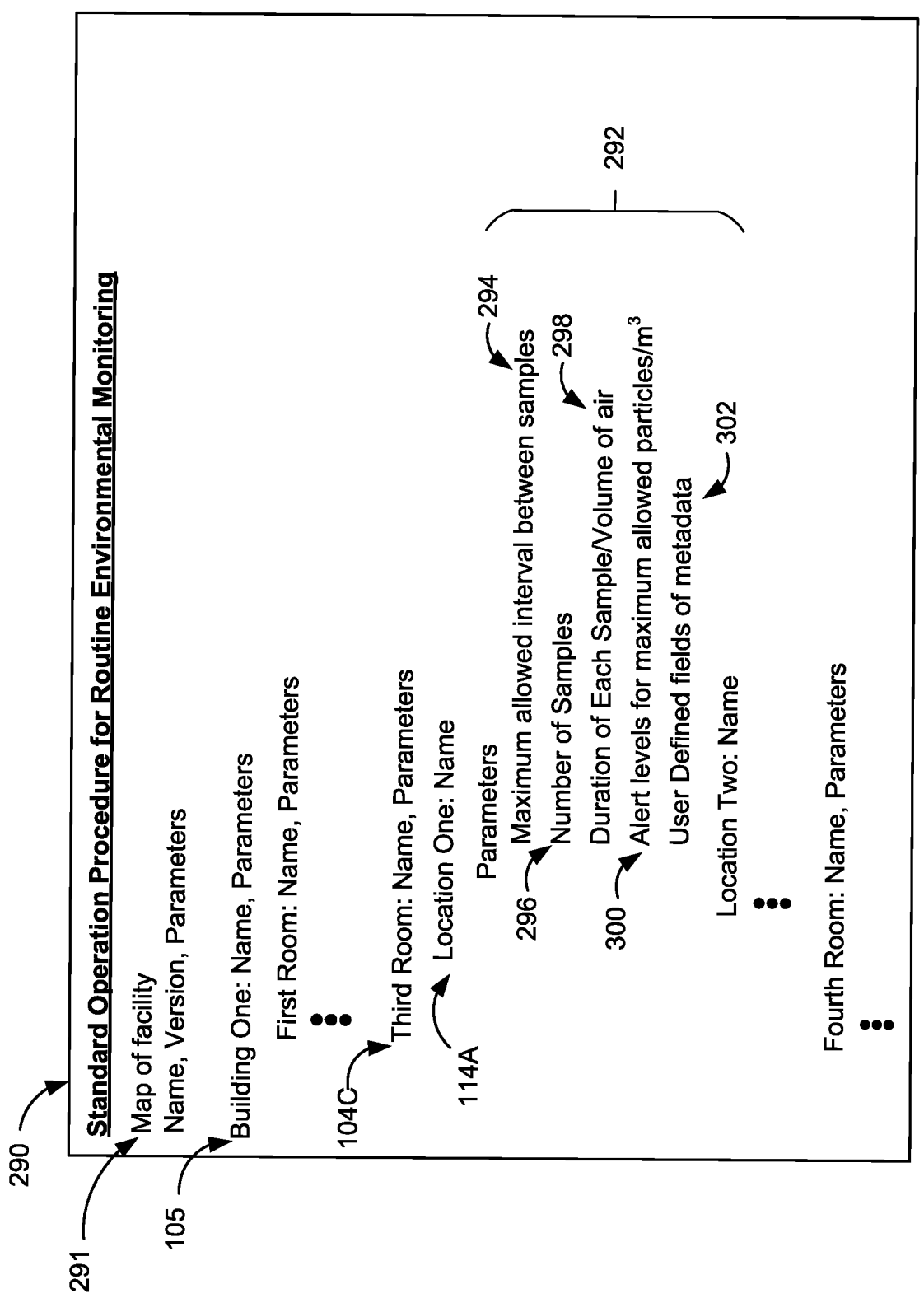

Standard Operation Procedure for Routine Environmental Monitoring

Map of facility
Name, Version, Parameters

Building One: Name, Parameters

First Room: Name, Parameters

●●●

Third Room: Name, Parameters

Location One: Name

Parameters
Maximum allowed interval between samples
Number of Samples
Duration of Each Sample/Volume of air
Alert levels for maximum allowed particles/m³
User Defined fields of metadata Location Two: Name

●●●

Fourth Room: Name, Parameters

Store sample data in a database of the air particle counter

384

Replicate the database of the air particle counter across other air particle counters using mesh networking to distribute the sample data

276

386

Update the dashboard user interface displaying the representation of the SOP and the compliance status associated with the SOP based on the sample data

MESH NETWORK SYSTEM OF ENVIRONMENTAL MONITORING DEVICES

CROSS-REFERENCE TO RELATED APPLICATIONS

This application is a national stage application of PCT/US2021/028403, filed Apr. 21, 2021, which claims the benefit of and priority to U.S. Provisional Patent Application No. 63/016,824, filed Apr. 28, 2020, the entire contents of which are incorporated herein by reference.

BACKGROUND

Environmental monitoring is implemented in various industries, particularly in industries where a number of particles present in the air and/or water, among other examples, is important to monitor and control. As one example, some industries have cleanrooms within their facilities that are utilized when small particles in the air can adversely affect a process, such as drug or electronic manufacturing processes or a scientific research protocol. Cleanrooms can implement filters employing laminar or turbulent air flow principles, for example, to maintain a controlled environment that has a low level of contamination or pollutants specified by the number of particles per cubic meter at a specified particle size within the air.

In some examples, the level of contamination or pollutants in cleanrooms can be monitored using independently operated monitoring devices such as air particle counters. For example, stationary or portable air particle counters can be placed in the cleanrooms to sample air to determine the number of particles per cubic meter of a specified particle size within the air. Often, facilities adopt a standard operating procedure (SOP) that provides specifications for the environmental sampling, including locations within the cleanrooms at which samples are to be taken, a duration between samples at each location, and particle count limits for each location, among other details. In some examples, other monitoring devices such as liquid particle counters and/or total organic carbon (TOC) analyzers, for example, can be implemented in addition or alternatively to air particle counters for environmental monitoring. Some of these facilities are regulated by governmental or other similar authorities, such as drug manufacturers regulated by the Federal Drug Administration, and the associated regulations dictate the SOP.

Due to the number of sampling locations, each with potentially varying specifications, and the use of different, independently operated monitoring devices to perform the environmental sampling, it is often difficult to accurately track and manage data associated with SOP compliance (e.g., whether particle limits are exceeded within a sample and/or a sample is overdue). Additionally, any updates to the SOP must be manually inputted for each monitoring device.

SUMMARY

In general terms, this disclosure is directed to monitoring devices, such as air particle counters, having mesh networking capabilities that are implemented for environmental monitoring within a facility. In one possible configuration and by non-limiting example, a monitoring device can include a wireless mesh networking device that communicates with one or more other monitoring devices within range that are associated with a facility monitoring system using a mesh network. Sample data collected by the monitoring device can be automatically synchronized (e.g., via database replication) across the other devices using mesh networking to facilitate environmental sampling within the facility and subsequent data and SOP management. Various aspects are described in this disclosure, which include, but are not limited to, the following aspects.

One aspect is a facility monitoring system. An example facility monitoring system includes a plurality of monitoring devices. Each of the monitoring devices can include a sensor configured to detect an environmental condition at a location in the facility; a wireless transceiver configured to communicate with wireless transceivers of one or more other monitoring devices using mesh networking; a memory storage device storing a database, the database including a standard operating procedure (SOP) of the facility and sample data based on the detected environmental condition; and a processing device configured to replicate the database across the plurality of monitoring devices using the mesh networking.

Another aspect is an air particle counter. An example air particle counter includes a particle sensor configured to detect particles within a sample captured at a location where the air particle counter is positioned within a facility; a communication interface configured to facilitate database replication across one or more other air particle counters within the facility using mesh networking; a processor coupled to the particle sensor and the communication interface; and a memory storage device coupled to the processor. The memory storage device stores instructions that, when executed by the processor, causes the processor to: based on a standard operating procedure (SOP) adopted by the facility, run the sample at the location using the particle sensor to generate a particle count for the location based on the particles detected by the particle sensor; store sample data in a database of the memory storage device, the sample data including the particle count; and replicate the database across the one or more other air particle counters using the mesh networking.

A further aspect is method performed by an air particle counter. An example method includes configuring a standard operating procedure (SOP) adopted by a facility; running a sample at a location within the facility based on the SOP to collect sample data; storing the sample data in a database of the air particle counter, the sample data including a particle count for the location; and replicating the database across one or more other air particle counters within the facility using mesh networking.

BRIEF DESCRIPTION OF THE DRAWINGS

FIG. 8A depicts an example configuration of an SOP.

DETAILED DESCRIPTION

Figure 1:
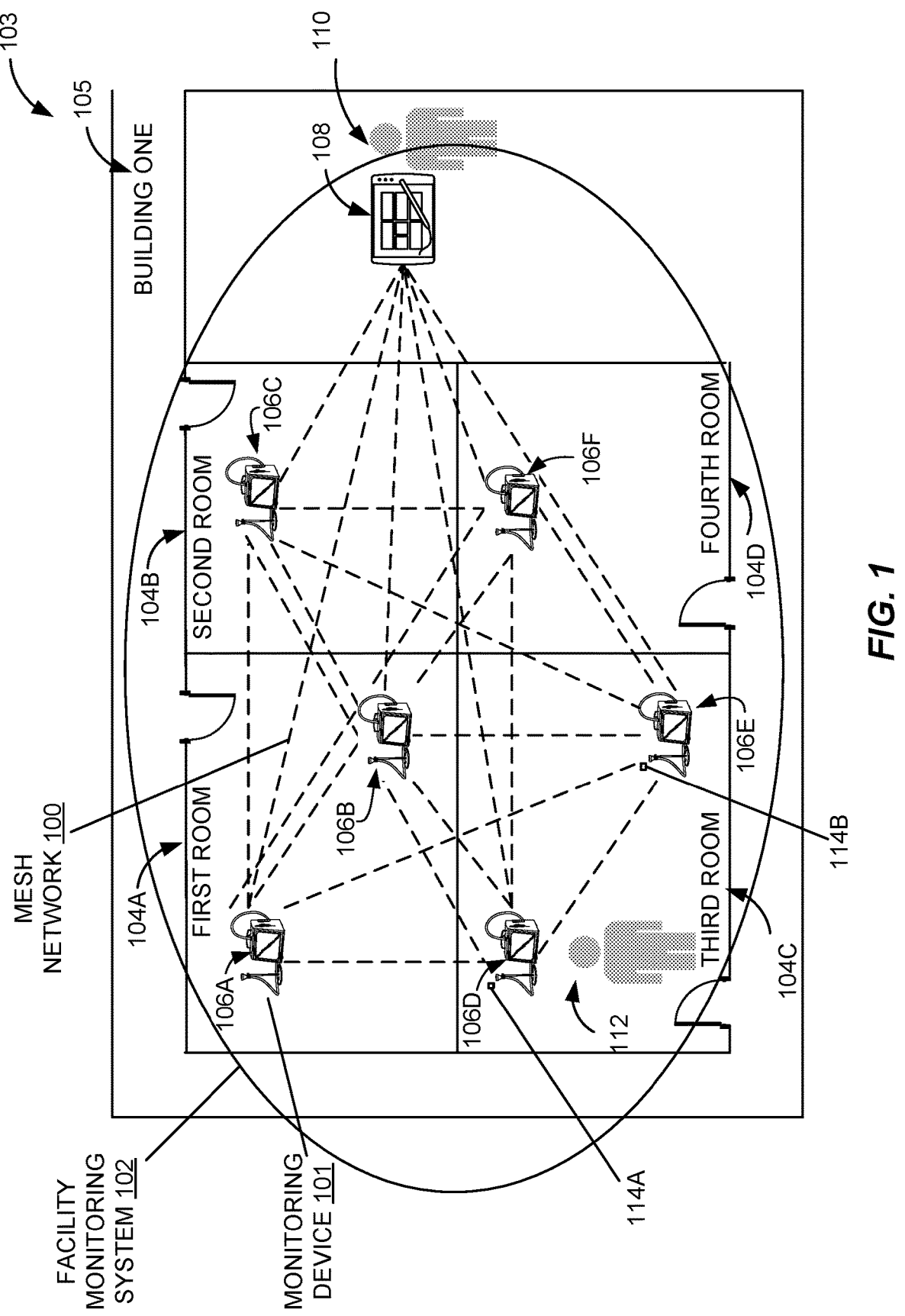
FIG. 1 schematically illustrates an example mesh network that is formed across monitoring devices of a facility monitoring system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 schematically illustrates an example mesh network 100 that is formed across monitoring devices 101 of a facility monitoring system 102. The facility monitoring system 102 can be a system implemented within a facility 103 to facilitate environmental sampling and management of data associated therewith. The facility monitoring system 102 can include a plurality of monitoring devices 101. The monitoring devices 101 can detect and/or monitor for various environmental conditions within the facility 103, including a particle count, a temperature, a pressure, and a humidity, among other conditions, based on a type of the monitoring device 101 and a type of environmental sampling to be performed within the facility 103.

As one example, the facility 103 has at least a first building 105 that includes a first room 104A, a second room 104B, a third room 104C, and a fourth room 104D (e.g., collectively rooms 104). The facility 103 can be a manufacturing facility that manufactures pharmaceuticals, for example, within the rooms 104. Small particles in the air can adversely affect the pharmaceutical manufacturing process. Therefore, each of the rooms 104 can be a cleanroom that maintains a controlled environment that has a low level of contamination or pollutants specified by the number of particles per cubic meter at a specified particle size within the air. For example, the cleanroom can implement filters employing laminar or turbulent air flow principles, for example, to maintain the controlled environment. In some examples, specifications for the cleanroom may be regulated and/or monitored by regulatory authorities, such as the Food and Drug Administration. In other examples, the specifications may be self-regulated by the facility 103 and/or an industry with which the facility 103 is affiliated.

To ensure the facility 103 is in compliance with the cleanroom specifications, a standard operating procedure (SOP) can be developed by the facility 103 for sampling the air within each cleanroom using monitoring devices 101 such as air particle counters 106A, 106B, 106C, 106D, 106E, and 106F, collectively air particle counters 106. For example, the SOP can indicate a plurality of locations at which samples are to be taken (e.g., sampling locations 114 within the rooms 104), contamination level limits for each location (e.g., particle count limits specifying a maximum number of particles of a particular size per cubic meter), and processes for collecting the samples, including a time schedule for taking the samples at each location and conditions under which the samples are to be taken at each location. Additionally, the SOP can describe how the data from the samples collected are to be managed and/or reviewed. In some examples, the SOP for each cleanroom can be dependent on a type of product being manufactured within.

In some examples, air samples are gathered while the manufacturing process is not active or "at rest". Additionally or alternatively, air samples are gathered while the manufacturing process is in operation. In pharmaceutical manufacturing processes, it is common to gather air samples both when at rest and in operation.

To prepare for sampling at a first sampling location 114A and a second sampling location 114B in the third room 104C, A technician 112 prequalifies and sterilizes air particle counters 106D and 106E, and prepares him or herself to enter the third room 104C, which can include putting on specialized clothing, the type of which is dependent on a classification of the cleanroom. The technician 112 then enters the third room 104C with the air particle counters 106D and 106E, positions the air particle counter at the location specified by the SOP, and activates sampling by the air particle counters 106D and 106E. For example, air particle counter 106D is placed at the first sampling location 114A and the air particle counter 106E is placed at the second sampling location 114B. Alternatively, the air particle counters 106D and 106E or portions thereof can be installed (e.g., fixed) at the first sampling location 114 A and the second sampling location 114B in the third room 104C, respectively, and the technician 112 enters the third room 104C and activates sampling by the air particle counters 106D and 106E. In other examples, sampling is activated remotely, rather than manually by the technician 112. Because more than one location may need to be sampled within a single cleanroom within a designated period of time according to the SOP, often times multiple air particle counters are brought into the cleanroom, placed at the locations specified by the SOP, and activated to begin sampling around a same time to satisfy timing requirements of the SOP, as illustrated in FIG. 1.

As described in greater detail with reference to FIG. 2 below, an example air particle counter 106 includes a main instrument coupled to an isokinetic probe. When sampling is activated, air is captured by the isokinetic probe. As the air is drawn into and advanced through the main instrument, the air passes through a particle sensor within the main instrument that identifies and obtains counts of particles of various sizes within the air. Additional data related to mass flow, temperature, humidity, and absolute pressure, for example, can be captured by additional sensors positioned within the main instrument. In some examples, the air particle counter has an external display through which one or more user interfaces can be presented to facilitate environmental sampling and SOP management as described below.

Currently, air particle counters 106 employed within facilities, like facility 103, operate in isolation of one another. An SOP is typically managed using a paper based interface and/or external software (e.g., software executed on devices other than the air particle counters 106). For example, in some facilities, paper-based checklists are used to verify that samples from each required sampling location have been collected, with deviations as to which air particle counters 106 performed what sampling having to be managed manually. The sampling-related data may then need to be manually entered into a database or tracking/data management related application. Paper checklists are not dynamic and do not account for multiple air particle counters being deployed in an ad hoc manner (e.g., use of a different air particle counter due to an instrument failure/battery run out/etc.). Additionally, paper checklists require human interaction and can lead to resampling if a check isn't made in a timely manner, for example, or missed sampling if a check is added erroneously, for example.

External software, such as MODA-EM™, helps automate these paper based processes by providing a tablet based interface for each air particle counter 106 that displays the sequence of actions and automatically transmits the sample-related data to a central server. However, external software requires significant hand-customization and wired or wireless connectivity to the central server. Therefore, if one or more of the air particle counters 106 becomes disconnected, the capability of dynamic response is removed, and connectivity to the central server is often times problematic due to poor reception in the sampling environment. As one example, stainless steel present in cleanrooms often blocks the wireless signals, leaving the air particle counters disconnected. Additionally, the external software often requires a significant investment, which is not reasonable for smaller facilities employing lesser numbers of air particle counters 106, for example.

Moreover, it is critical when the facility's SOP changes, that all air particle counters 106 in use within the facility 103 are updated such that samples are collected in accordance with the new or updated SOP. The isolated operation of the air particle counters 106 makes such updates challenging. Specifically, the coordination of updates to the facility's SOP must be performed manually. For example, the updated SOP must be manually input into each of the air particle counters 106 in use within the facility 103. This manual process leads to the risk that the SOP is not deployed entirely across the air particle counters in use. Additionally, this manual process does not provide the facility 103 with a single view of the state of the deployment of a new or updated version of the SOP, thus the facility cannot have confidence that they are collecting samples as mandated by a new or updated version of the SOP.

To overcome the above-discussed difficulties and challenges currently faced, the monitoring devices 101, such as the air particle counters 106, described herein are each wireless mesh network devices that can form the mesh network 100. For example, each of the air particle counters 106 have a wireless transceiver that conforms to a protocol, such as the IEEE 802.11s protocol, which enables the air particle counters 106 to communicate with one another, when in range, using mesh networking. While the IEEE 802.11s protocol is used as a specific example protocol for mesh networking herein, this is a non-limiting example. Other mesh networking protocols can similarly be implemented whether at the physical, link, or application layer. In addition to the air particle counters 106, other computing devices that are associated with the facility monitoring system 102, such as computing device 108 can have mesh networking capabilities that enable communication between the computing device 108 and the air particle counters 106 when in range. The air particle counters 106 and the computing device 108 having the mesh networking capabilities can be collectively referred to as nodes or peers of the mesh network 100.

An example mesh network 100 acts a backbone to which a plurality of peers are connected for routing data among the peers. Often, one of the peers is physically wired to a network connection. The physically wired peer then shares its network connection wirelessly with all other peers within its range. Those peers then share the connection wirelessly with peers within their range, and so on. In some examples, the mesh network 100 is capable of automatically incorporating a new peer into the existing structure (e.g., the mesh network 100 is self-configuring) making the mesh network 100 extremely adaptable and expandable as more or less coverage is needed. In additional examples, the mesh network 100 can automatically find the fastest and most reliable paths to send data among the peers, even if some of the peers are blocked or lose connectivity (e.g., the mesh network 100 is self-healing).

To improve security of the mesh network 100, when a new peer is added or connects to the mesh network 100, the mesh network 100 can employ a security protocol to authenticate the new peer. In other instances, authentication can also be performed among established peers of the mesh network 100. For example, authentication can be performed each time a peer reconnects to the mesh network 100 after being isolated, on a schedule (e.g., after a predetermined period of time), or in response to events occurring in the mesh network 100 that may comprise the security of the mesh network 100, among other similar instances.

In some examples, the mesh network 100 has a partial mesh topology, where each peer is connected to at least one other peer and daisy-chaining can be implemented to distribute data across the peers. In other examples, the mesh network 100 has a full mesh topology, where each peer is connected to every other peer to enable distribution of data between each peer. When a peer is connected to one or more other peers, a database of the peer can be automatically replicated across all the peers directly or via daisy-chaining to distribute data. As a result, each of the peers include a database comprising a synchronized or replicated set of data. Additionally, one or more of the peers can be connected over another network, such as the Internet, to a cloud-based server providing storage, among other examples. The synchronized or replicated set of data within the database of the connected peer(s) can be transmitted over the network and stored in the cloud-based storage, where back-office features and/or other processes, such as datamining, can be hosted. In some examples, the synchronized or replicated set of data can include a current version of the SOP and sample data collected by each of the air particle counters 106, for example.

As one example, once the running of the sample is completed at the air particle counter 106D and sample data is stored in a database of the air particle counter 106D, the database can be replicated across one or more of the other air particle counters 106A, 106B, 106C, 106E, and 106F using the mesh networking to distribute the sample data. The database of the air particle counter 106D can be similarly replicated in response to receipt of a new or updated SOP at the air particle counter. Accordingly, each of the air particle counters 106 have a database storing a current version of the SOP, sample data collected by the air particle counter 106 itself, as well as sample data collected by other air particle counters 106. Thus, rather than having a central database storing the SOP and the sample data to which all the of air particle counters 106 transmit data to and download data from that requires wireless connectivity, each air particle counter has its own complete database that is automatically and continuously updated as the air particle counters 106 distribute data over the mesh network 100. Having a complete database allows each of the air particle counters 106 to be fully operational even when the air particle counter 106 becomes isolated from the mesh network 100 (e.g., if the air particle counter 106 is out of range from another peer). Additionally, the data is distributed with other peers of the mesh network 100, including the computing device 108.

Isolation from the mesh network 100 can occur when a portable air particle counter, for example, is moved into a cleanroom as the cleanroom often inhibits radio communications. In other examples, a stationary air particle counter is isolated due to its fixed position outside of the mesh network 100 and is only able to communicate over the mesh network 100 when a portable particle counter connected to the mesh network 100 comes into proximity with stationary air particle counter. In further examples, an air particle counter can be out of range from any other air particle counter to communicate over the mesh network 100.

The air particle counters 106 and the computing device 108 can each execute a facility monitoring application. The facility monitoring application can facilitate environmental sampling performed by the air particle counters 106, as well as SOP management. For example, to facilitate environmental sampling, the facility monitoring application can generate a sampling user interface accessible through a display of the air particle counters 106 and/or through a display of the computing device 108. The sampling user interface can include sampling controls, such as a start control that enables a user to begin sampling by an air particle counter (e.g., activated by technicians 112 through the display of the air particle counters 106 while in the rooms 104 or remotely through the computing device 108). As the sample is run the sampling user interface can display information in real-time, including the location, a number of samples to be run at the location, an identifier of the sample currently running, an elapsed time associated with the sampling, and the sample data as it is being collected. The sampling user interface also has a stop control to enable the sampling to be manually stopped. The sampling user interface further has a comment control that enables the user to enter comments about the sampling. For example, the user can note if there was anything unusual that occurred during sampling.

Additionally, to facilitate SOP management, the facility monitoring application has a data management component to monitor and archive the data received from the air particle counters 106 to effectively track and manage compliance with the SOP across an entirety of the facility 103. In some examples, the computing device 108 is associated with a user 110, such as an SOP administrator for example, that reviews the data via the facility monitoring application. As described in additional detail below, the facility monitoring application can provide a single view (e.g., a dashboard user interface) representing the version of the SOP deployed across the facility 103 and a compliance associated therewith that is maintained and updated based on data received from the air particle counters 106. Similar to the sampling user interface, the dashboard user interface can be presented through displays of the air particle counters 106 and/or the computing device 108.

While the above example and description focuses on air particle counters 106 having mesh network capabilities that are placed within cleanrooms to facilitate monitoring of air quality, other types of monitoring devices 101 having mesh network capabilities can be similarly implemented in other types of environments. Other example monitoring devices 101 can include liquid particle monitors, total organic carbon (TOC) analyzers, and cellular analysis instruments. In further examples, a combination of these monitoring devices 101 can be implemented as a fleet that are connected over the mesh network 100.

Figure 2:
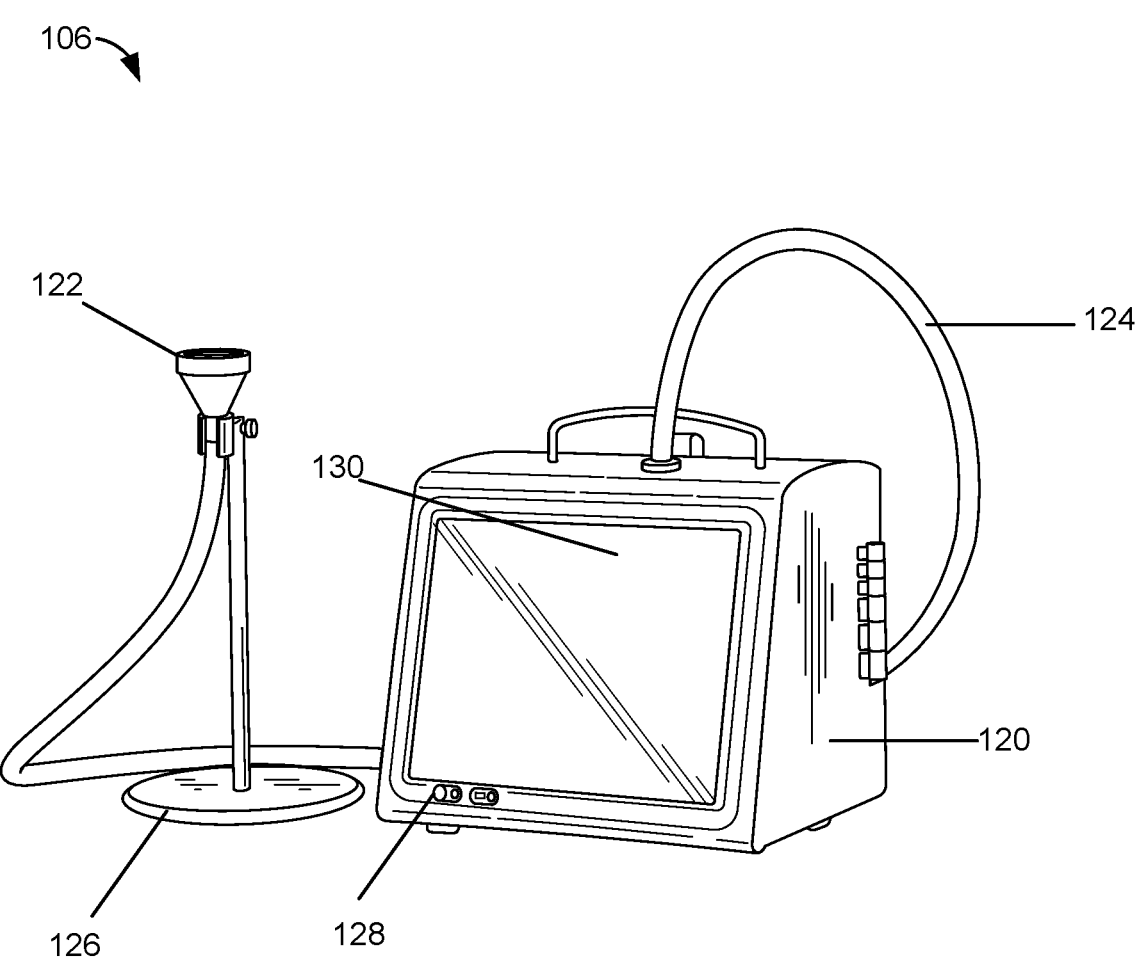
FIG. 2 schematically illustrates an example of an air particle counter.

FIG. 2 schematically illustrates an example air particle counter 106. The air particle counter 106 is one type of monitoring device 101 that can be implemented for environmental sampling within a facility, such as the facility 103 shown and described in FIG. 1. The air particle counter 106 includes a main instrument 120 coupled to an isokinetic probe 122. In some examples, the main instrument 120 is coupled to the isokinetic probe 122 by a connection hose 124. The air particle counter 106 can be a portable unit. For example, the air particle counter 106 can be moved by a user to different areas, subareas, and/or sampling locations within the facility. In other examples, the air particle counter 106 can be fixed at a particular sampling location. For example, the air particle counter 106 can be mounted to a ceiling, a wall, a floor, or other similar structure. In further examples, the air particle counter 106 can be partially fixed at a particular sampling location, where the isokinetic probe 122 is mounted to a ceiling, a wall, a floor, or other similar structure, while the main instrument 120 is portable.

A sample of air, for example, is captured by the isokinetic probe 122 at the sampling location. In some examples, the isokinetic probe 122 can be positioned within a stand 126 based on a direction of air flow to facilitate the capture. A velocity of the air going into the isokinetic probe 122 can be equal to the velocity of the undisturbed air such that a substantially same number of particles go into isokinetic probe 122 as would have passed the area of the isokinetic probe 122 had it not been there.

The main instrument 120 can include a power button 128 to manually turn on the air particle counter 106 prior to initiating the sampling. As described in greater detail with reference to FIG. 3, the main instrument 120 also includes a blower that draws the air captured by the isokinetic probe 122 into the main instrument 120, when sampling begins, and keeps the air moving throughout the main instrument 120 until expelled. As the air moves throughout the main instrument 120, the air passes through a particle sensor of the main instrument 120. The particle sensor can identify and obtain counts of particles of various sizes within the air. Additionally, data related to mass flow, temperature, humidity, and absolute pressure can be captured by additional sensors of the main instrument 120 as the air moves throughout the main instrument 120.

In some examples, the main instrument 120 includes an external display 130. The external display 130 can be a touch screen capable of receiving user input. In some examples, the external display 130 can present a sampling user interface. In some examples, the sampling user interface is provided by the facility monitoring application executing on a computing device of the air particle counter 106. A user can manually begin sampling by selecting a start control displayed on the sampling user interface. The user can also select a pause and/or stop control displayed on the sampling user interface as the sample is being run to respectively pause or stop the sampling. Additionally, the sampling user interface displays information about each sample as it is being run by the air particle counter 106. Example information displayed can include the sampling location, how many samples are being run, the sample currently being run, an elapsed time associated with the sampling, and data including counts of particles of various sizes, and other environmental conditions, such as air temperature, humidity and velocity. In further examples, the external display 130 can provide a dashboard user interface that includes a single top-down view representing the version of the SOP deployed across the facility 103 and a compliance associated therewith to facilitate SOP management. Similar to the sampling user interface, the dashboard user interface is provided by the facility monitoring application executing on the computing device of the air particle counter 106.

Additionally, in some examples, the air particle counter 106 is an IEEE 802.116s wireless mesh network device that is capable of distributing sample data for samples run by the air particle counter 106, as well as any new or updated SOP received at the air particle counter 106 with other air particle counters or computing devices having mesh networking capabilities within the facility, as described in greater detail below with reference to FIG. 3.

Figure 3:
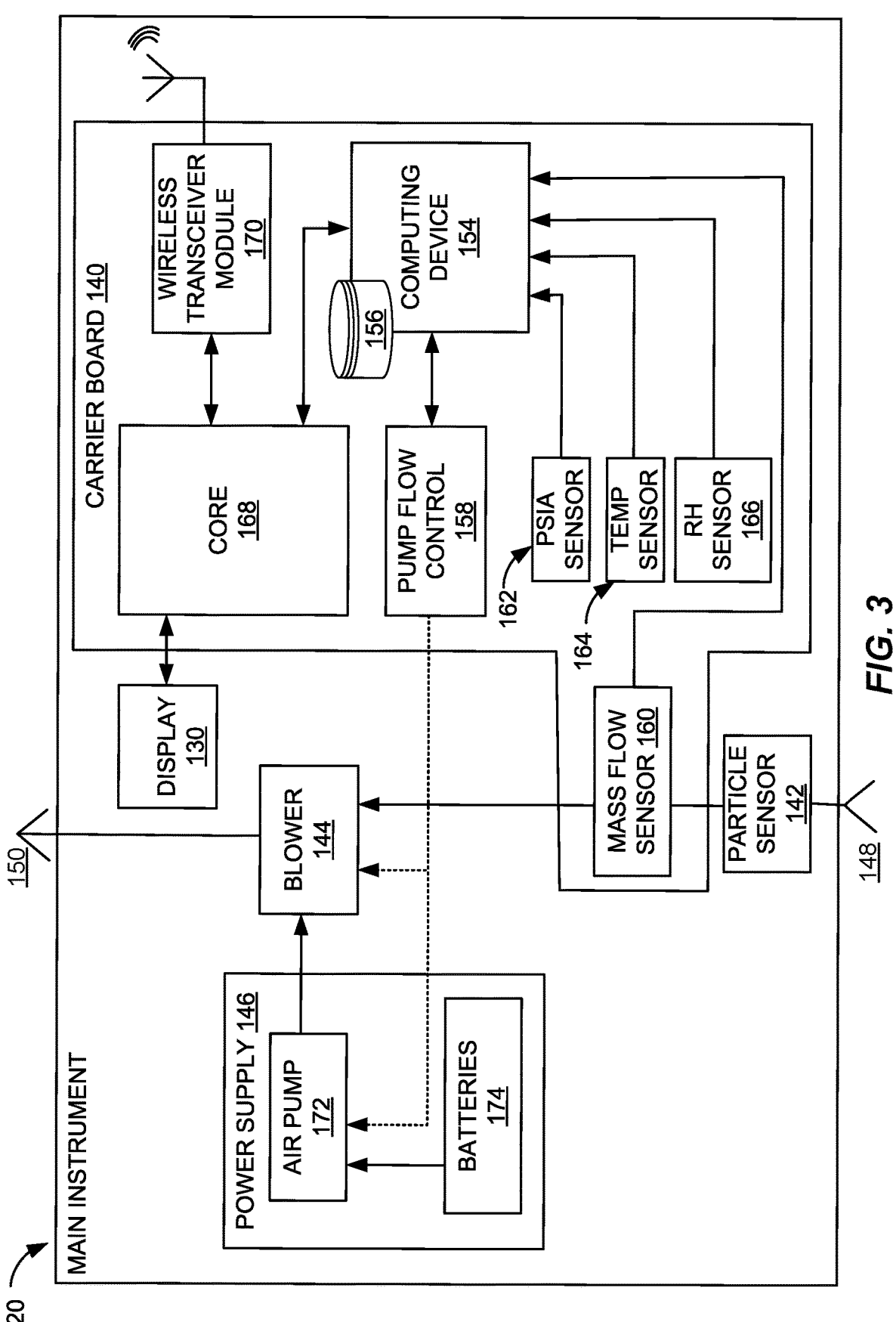
FIG. 3 is a block diagram of example hardware components of an air particle counter.

FIG. 3 is a block diagram of example hardware components of the main instrument 120 of the air particle counter 106 shown and described in FIG. 2. The main instrument 120 includes a carrier board 140, a particle sensor 142, a blower 144, a power supply 146, and a display 130, as well as an intake port 148 and an exhaust port 150. The carrier board 140 includes a computing device 154, a database 156, a pump flow control 158, a mass flow sensor 160, an absolute pressure sensor (PSIA sensor) 162, a temperature sensor (temp sensor) 164, a relative humidity sensor (RH sensor) 166, a core 168, and a wireless transceiver module 170. The power supply 146 includes an air pump 172 and batteries 174.

The air particle counter 106 can be used within a facility to detect environmental conditions such as particle counts, pressure, temperature, and/or humidity of air at one or more sampling locations. A sample of air captured by the isokinetic probe 122 enters the main instrument 120 via the intake port 148. In some examples, the blower 144 draws the air sample into the intake port 148 of the instrument, and advances the air sample through the main instrument 120 until the air sample is expelled via the exhaust port 150.

As the air sample is advanced through the main instrument 120, the air sample can be passed through a plurality of sensors. For example, the air sample can be passed through the particle sensor 142. The particle sensor 142 can identify particles of various sizes within the air sample. One example technique employed by the particle sensor 142 to identify the particles is a light scattering technique. In some examples, the particle sensor 142 can include at least an inlet for the air sample, a light source, collections optics, a reflector, a photodetector, and an outlet for the air sample. The particle sensor 142 can provide particle-related data to the computing device 154 as an analog signal. For example, the analog signal includes pulses, where an amplitude of each pulse is proportional to a size of the particle. The computing device 154 can then convert the analog signal to a digital signal (e.g., a digital bit), determine particle sizes based on the digital signal, where the particle sizes can be between 300 nanometers and 10,000 nanometers, and for each particle size, determine a number of particles of the respective particle size based on the digital signal. For example, the computing device 154 can provide as output a number of particles per cubic meter having a specified particle size within the air sample (e.g., particle counts for the air sample). In some examples, the computing device 154 is a field programmable gate array (FPGA). Other example techniques employed by the particle sensor 142 to detect the particles can include light obscuration or direct imaging techniques.

The determined particle counts for the air sample can be stored in the database 156. Additionally, the computing device 154 can provide the determined particle counts to the core 168. In some examples, the core 168 can provide the determined counts along with additional sample related data to the display 130 for presentation through the sampling user interface described above with reference to FIG. 2. For example, the display 130 can present details about the sampling location, how many samples are being run, the sample currently being run, an elapsed time associated with the sampling, and determined particle counts. The core 168 can also provide the determined particle counts and other sample-related data to the wireless transceiver module 170. In some examples, the wireless transceiver module 170 can implement the IEEE 802.11s protocol, and distribute the determined particle counts and other sample-related data with one or more other peers over the mesh network 100, where the peers can include other air particle counters and/or other computing devices. The wireless transceiver module 170 can also support WiFi and Bluetooth communications. For example, alternatively or in addition to being connected to peers over the mesh network 100, the air particle counter 106 can be communicatively connected to other devices over other wireless networks. Further, the wireless transceiver module 170 can receive particle counts and other sample related data associated with air samples captured by the other air particle counters that have been distributed over the mesh network 100, for provision to the computing device 154 and storage within the database 156.

Additionally, as the air sample is advanced by the blower 144 through the main instrument 120, the air sample is passed through the mass flow sensor 160. The mass flow sensor 160 can determine a flow rate of the air sample as it is drawn in and advanced through the main instrument 120 by the blower 144. The flow rate data can be provided to the computing device 154. In some examples, the flow rate is measured in order to control and maintain a particular flow rate throughout the main instrument 120. For example, the computing device 154 can generate a control signal for transmission to the air pump 172 via the pump flow control 158 based on a desired flow rate. The air pump 172, powered by the batteries 174, in turn controls a rate at which the blower 144 draws in air samples. The control signal can be adjusted based on the flow rate data received to maintain the desired flow rate.

Further, as the air sample is advanced by the blower 144 through the main instrument 120, the air sample can be passed through one or more of the PSIA sensor 162, the temp sensor 164, and the RH sensor 166 to capture data related to an absolute pressure, temperature, and humidity of the air, respectively. The data can be provided to the computing device 154 for storage within the database 156. In some examples, this data is used in combination with the flow rate data to adjust the control signals, as factors such as temperature, pressure, and humidity can affect the flow rate. Additionally, the data can be provided to the core 168, and the core 168 can provide temperature, pressure, and humidity data to the display 130 for presentation and/or to the wireless transceiver module 170 for distribution as part of the sample data.

Figure 4:
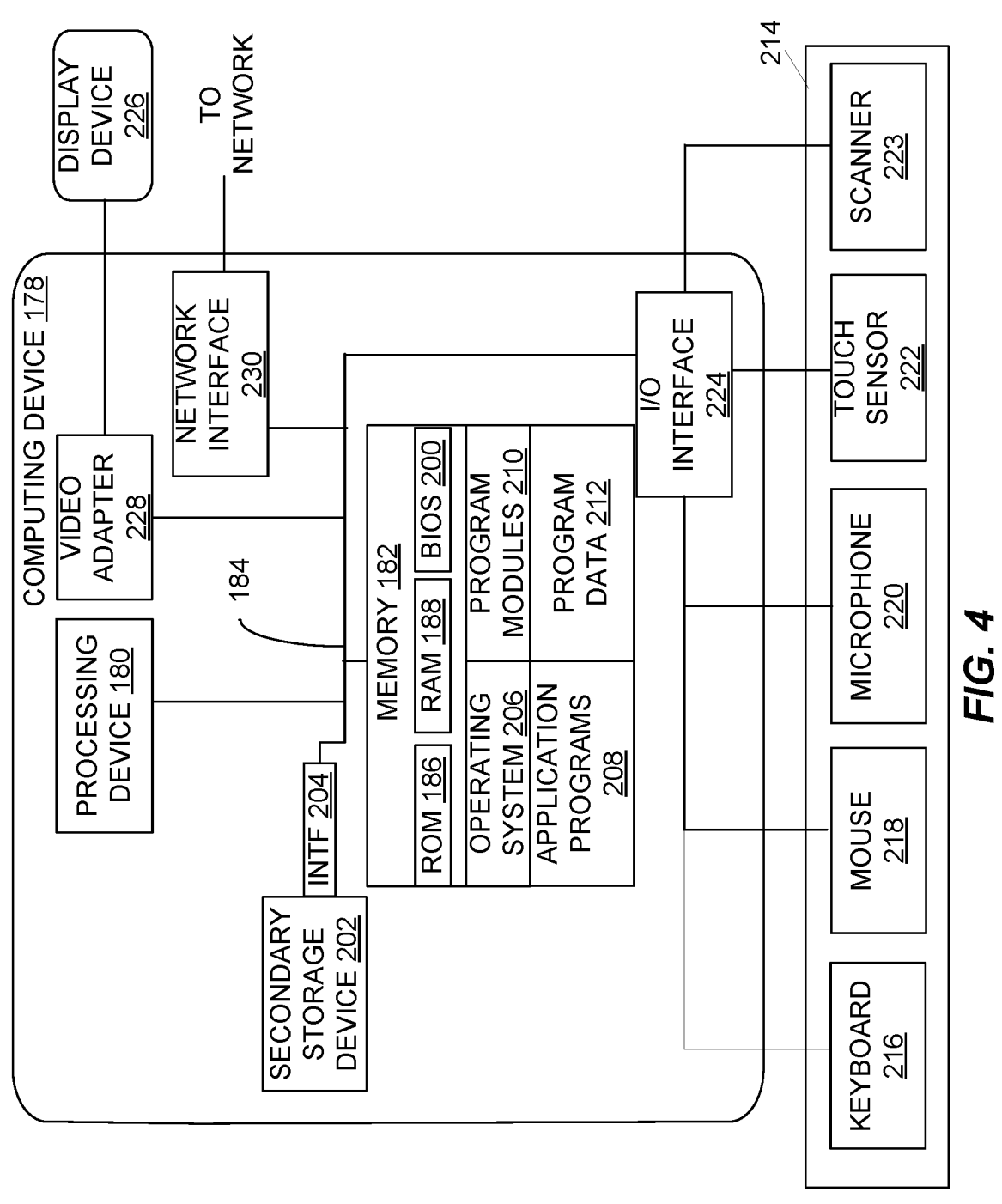
FIG. 4 is a block diagram of an example computing device.

FIG. 4 is a block diagram of an example computing device 178 that can be used to implement aspects of the present disclosure. The computing device 178 can be an example of the computing device 154 of the air particle counter 106 shown and described in FIG. 3 and/or the computing device 108 shown and described in FIG. 1. The computing device 178 can be used to execute the operating system, application programs, and software modules (including the software engines) described herein.

The computing device 178 includes, in some embodiments, at least one processing device 180, such as a central processing unit (CPU). A variety of processing devices are available from a variety of manufacturers, for example, Intel or Advanced Micro Devices. In this example, the computing device 178 also includes a system memory 182, and a system bus 184 that couples various system components including the system memory 182 to the processing device 180. The system bus 184 is one of any number of types of bus structures including a memory bus, or memory controller; a peripheral bus; and a local bus using any of a variety of bus architectures.

The system memory 182 includes read only memory 186 and random access memory 188. A basic input/output system 200 containing the basic routines that act to transfer information within computing device 178, such as during start up, is typically stored in the read only memory 186.

The computing device 178 also includes a secondary storage device 202 in some embodiments, such as a hard disk drive, for storing digital data. The secondary storage device 202 is connected to the system bus 184 by a secondary storage interface 204. The secondary storage device 202 and their associated computer readable media provide non-volatile storage of computer readable instructions (including application programs and program modules), data structures, and other data for the computing device 178.

Although the exemplary environment described herein employs a hard disk drive as a secondary storage device, other types of computer readable storage media are used in other embodiments. Examples of these other types of computer readable storage media include flash memory cards, digital video disks, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 202 or system memory 182, including an operating system 206, one or more application programs 208, other program modules 210 (such as the software engines described herein), and program data 212. One example application program includes the facility monitoring application. The computing device 178 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system.

In some embodiments, a user provides inputs to the computing device 178 through one or more input devices 214. Examples of input devices 214 include a keyboard 216, mouse 218, microphone 220, touch sensor 222 (such as a touchpad or touch sensitive display), and a scanner 223 capable of reading machine-readable codes. Other embodiments include other input devices 214. The input devices are often connected to the processing device 180 through an input/output interface 224 that is coupled to the system bus 184. These input devices 214 can be connected by any number of input/output interfaces, such as a parallel port, serial port, game port, or a universal serial bus. Wireless communication between input devices and the input/output interface 224 is possible as well, and includes infrared, BLUETOOTH® wireless technology, IEEE 802.11a/b/g/n/s (etc.), cellular, ultra-wideband (UWB), ZigBee, LoRa, or other radio frequency communication systems in some possible embodiments.

In this example embodiment, a display device 226, such as a monitor, liquid crystal display device, projector, or touch sensitive display device, is also connected to the system bus 184 via an interface, such as a video adapter 228. In addition to the display device 226, the computing device 178 can include various other peripheral devices (not shown), such as speakers or a printer.

When used in a local area networking environment or a wide area networking environment (such as the Internet), the computing device 178 is typically connected to the network through a network interface 230, such as an Ethernet interface. Other possible embodiments use other communication devices. For example, some embodiments of the computing device 178 include a modem for communicating across the network.

The computing device 178 typically includes at least some form of computer readable media. In some examples, the computer readable media can be stored within the memory 182. Computer readable media includes any available media that can be accessed by the computing device 178. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 178.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device 178 illustrated in FIG. 4 is also an example of programmable electronics, which may include one or more such computing devices, and when multiple computing devices are included, such computing devices can be coupled together with a suitable data communication network so as to collectively perform the various functions, methods, or operations disclosed herein.

Figure 5:
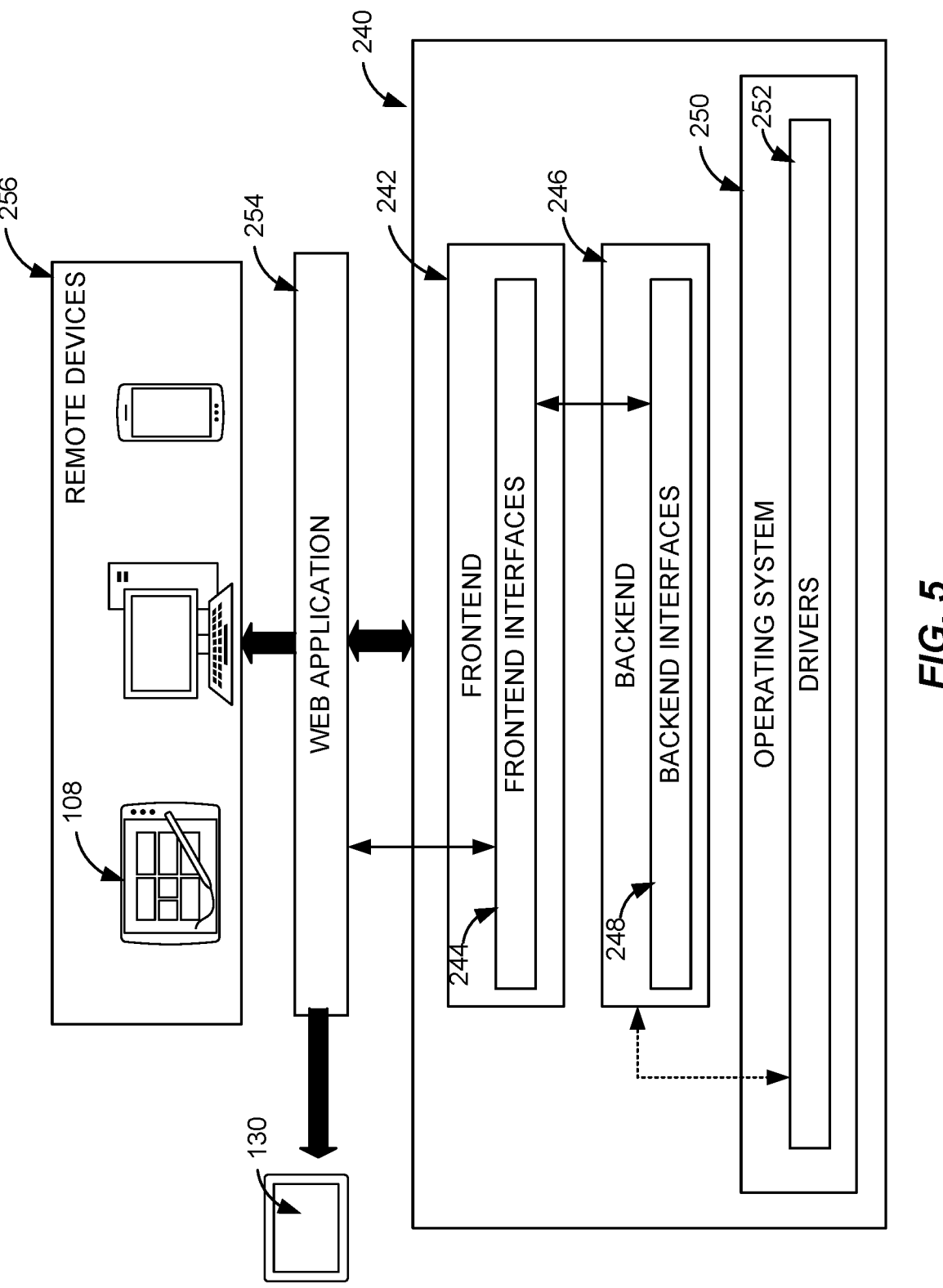
FIG. 5 is a block diagram of example software components executed by an air particle counter.

FIG. 5 is a block diagram of example software components 240 executed by the air particle counter 106 shown and described in FIGS. 1-3. For example, the computing device 154 of the air particle counter 106 can execute the software components 240. In some examples, the software components 240 can include a frontend 242 of the facility monitoring application comprising frontend interfaces 244, a backend 246 of the facility monitoring application comprising backend interfaces 248, an operating system 250, and one or more drivers 252.

In one example, the operating system 250 can be Linux kernel. The drivers 252 can operate or control devices that are attached to the computing device 154, and enable communication between the operating system 250 and the devices. As one example, at least one of the drivers 252 communicates with the computing device 154 to retrieve the sampling data being collected by the air particle counter 106 in real time, such as the particle counts, temperature, relative humidity, and pressure.

Frontend interfaces 244 and backend interfaces 248 help facilitate communication between the frontend 242 and the backend 246. One example interface is an asynchronous messaging library, such as ZeroMQ. In some examples, the backend 246 can monitor for real time events that are occurring, such as running or completion of a sample. For example, the backend 246 can send analog updates and account updates on a continuous fixed interval, where these updates are used to update the sampling user interface and/or the dashboard user interface presented, as discussed below. Additionally, the backend 246 can receive commands from the frontend 242 through the asynchronous messaging library. For example, one command can include for the air particle counter 106 to begin sampling.

Additionally, the frontend interfaces 244 facilitate communication between the frontend 242 and a web version of the facility monitoring application (e.g., web application 254 that is executed by a web server) through which information is displayed through the display 130 of the air particle counter 106 or a display of remote devices 256, such as the computing device 108, connected to the air particle counter 106 over the mesh network 100. The information displayed can include the dashboard user interface representing the SOP and compliance associated therewith is displayed and/or the sampling user interface displaying the sample data as it is being collected. One example interface of the frontend interfaces 244 is a data query and manipulation language for APIs, such as graph QL.

Figure 6:
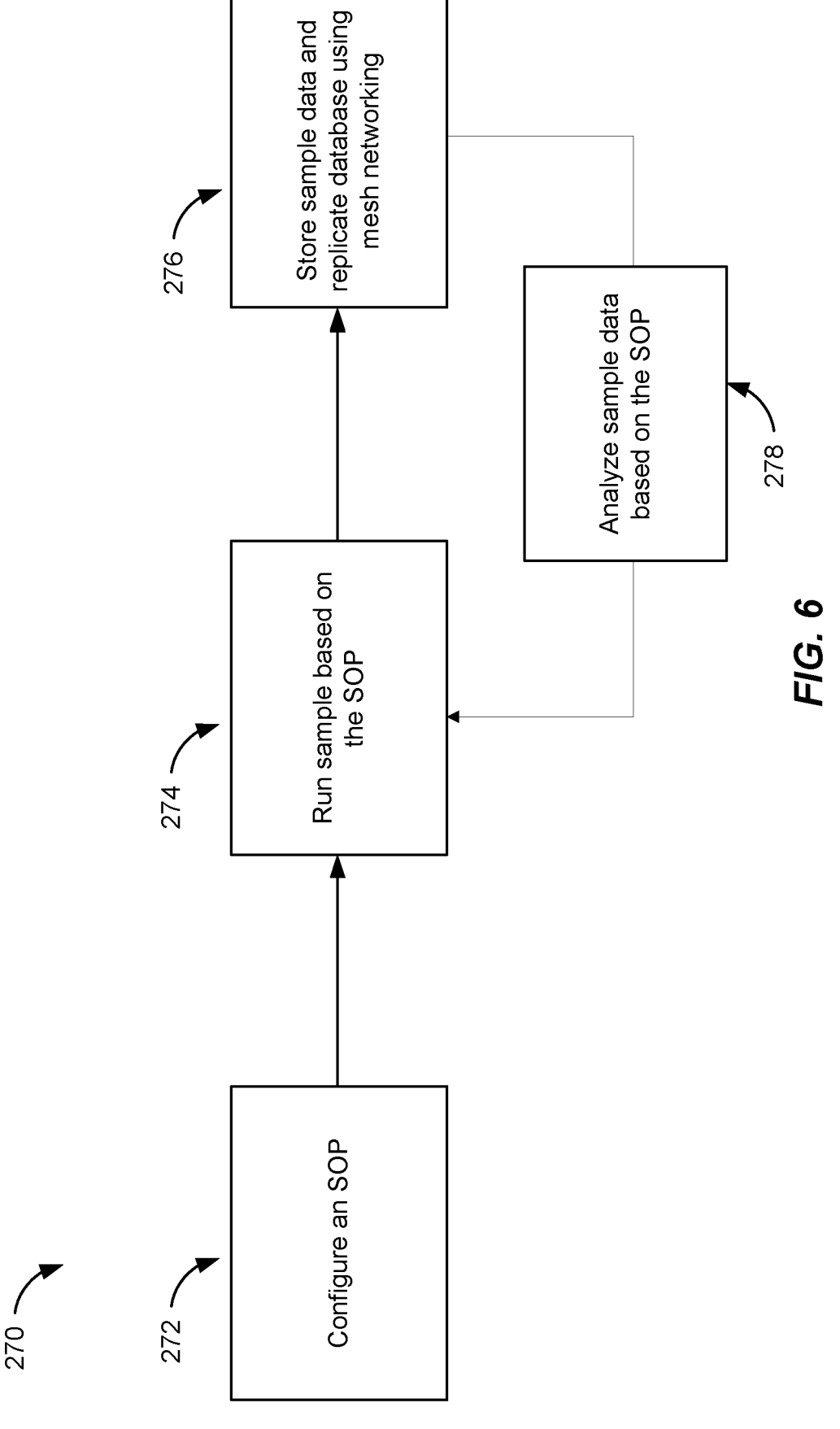
FIG. 6 is an example method for environmental monitoring using an air particle counter having mesh network capabilities.

FIG. 6 is an example method 270 for environmental monitoring using a monitoring device 101 having mesh network capabilities. The example monitoring device can be an air particle counter 106 shown and described in FIGS. 1-3. For example, the air particle counter is a peer of a mesh network 100 that opportunistically connects with other peers in the mesh network 100, such as other air particle counters, to enable automatic and continuous distribution of data among the peers. Similar methods can be performed for other types of monitoring devices having mesh networking capabilities, such as liquid particle counters and TOC analyzers, among other similar monitoring devices.

The process can begin at operation 272, where an SOP adopted by a facility, such as the facility 103, is configured at the air particle counter as described in greater detail below with reference to FIG. 7. The SOP can include a plurality of sampling locations within the facility, particle count limits for each sampling location, and processes for running or collecting the samples at each sampling location. Each air particle counter 106 used by the facility can be configured with the SOP. An example SOP is shown and described below with reference to FIGS. 8A and 8B. The configuring, in some examples, includes generation of a dashboard user interface that represents the SOP and a compliance status associated therewith, as shown and described below with reference to FIGS. 9, 10, and 11.

The process can proceed from operation 272 to operation 274, where a sample is run by the air particle counter based on the SOP. For example, the dashboard user interface can indicate a particular sampling location is non-compliant (e.g., a last sample at the location resulted in an error and/or excursion or is past due) or is soon to be non-compliant (e.g., a specified duration between samples set by the SOP is about to lapse). In response, the air particle counter can be positioned at the sampling location and run according to the sampling specifications of the SOP, as described in greater detail below with reference to FIG. 12

Once the sample has been run, the process can proceed from operation 274 to operation 276, where sample data is stored in the database of the air particle counter and synchronized across the mesh network 100. For example, the synchronization can involve replication of the database of the air particle counter across peers using the mesh networking. The sample data can include particle counts for specified sizes of particles within the sample, along with other sample related data. Additional details regarding synchronization or replication are described in detail with reference to FIGS. 13-17.

The process can proceed from operation 276 to operation 278 where the sample data is analyzed in view of the SOP. For example, the sample data is analyzed to determine whether any errors or excursions (e.g., exceeded particle count limits) occurred, and if so whether any information is available to justify the error or excursion, as discussed in greater detail with reference to FIG. 18. Analysis of the sample data can also include generation of a report. The report can be for internal review within the facility and/or external review as evidence of compliance with the SOP, for example. In some examples, if there is an error or an excursion detected, the process returns to operation 274 to re-run the sample. In other examples, the process returns to operation 274 after the duration between samples specified by the SOP has lapsed. Additionally, if a new SOP or updates to the SOP are received, the process can return to operation 272 and the SOP can be re-configured.

Figure 7:
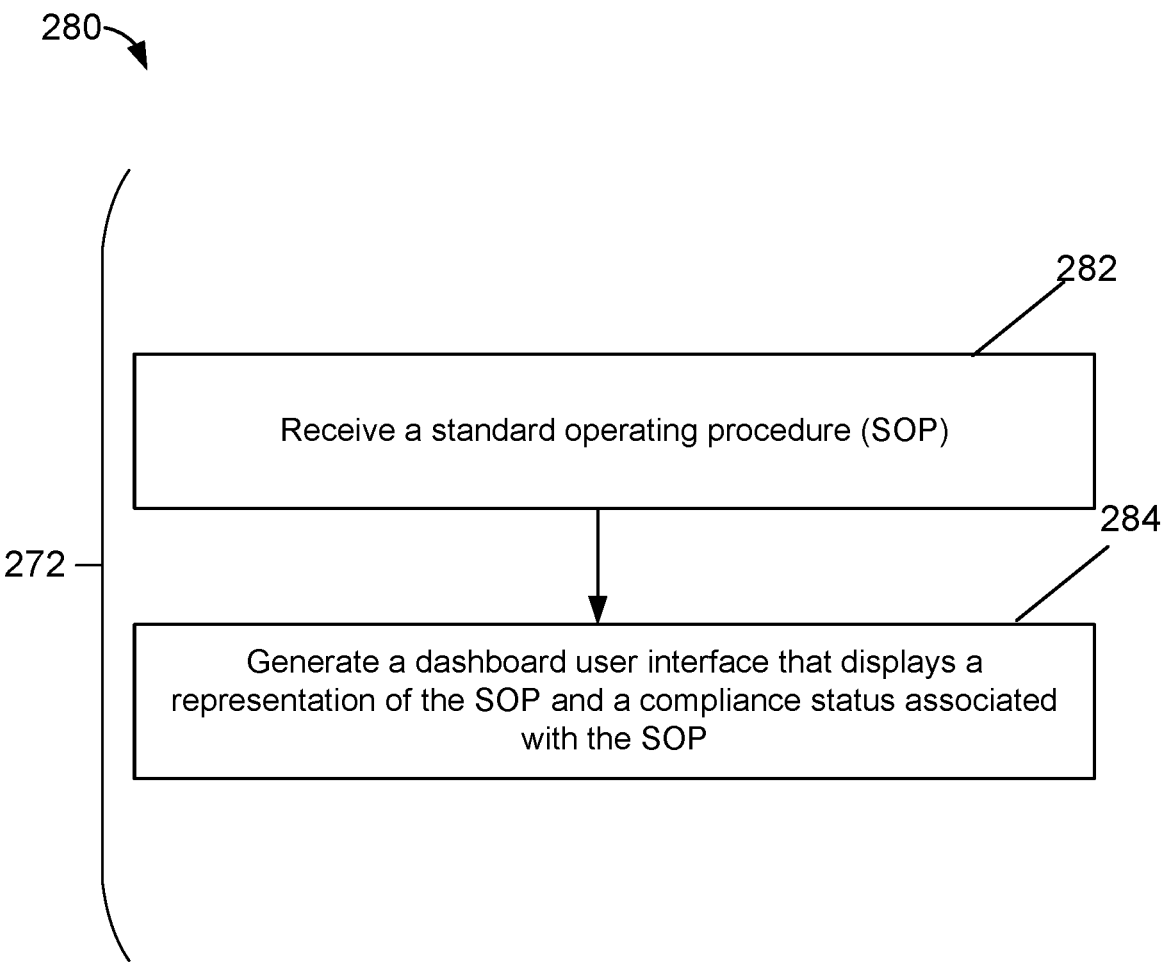
FIG. 7 is a flowchart illustrating an example method for configuring a standard operating procedure (SOP).

FIG. 7 is a flowchart illustrating an example method 280 for configuring an SOP adopted by a facility, such as facility 103. In some examples, the method 280 can be used to at least partially perform the operation 272 shown and described in FIG. 6. The method 280 can be performed by a monitoring device, such as an air particle counter shown and described in FIGS. 1-3.

The method 280 can begin at operation 280 when the SOP adopted by the facility is received. In some examples, the SOP is imported to the air particle counter using a physical memory device, such as a USB drive. In other examples, the SOP is directly input through a display 130 of the air particle counter (e.g., the display 130 of the air particle counter 106). In further examples, the SOP is received over the mesh network 100. For example, the SOP can be received (e.g., imported or otherwise input) at another peer of the mesh network 100, and distributed across the peers over the mesh network 100. An example of the SOP received is shown and described in greater detail with reference to FIGS. 8A and 8B. The SOP includes a plurality of sampling locations within the facility 103, particle count limits for each location, and processes for collecting samples at each location, including a number of samples to be run at the location at a given time, a time schedule for taking each sample at the location, and conditions under which each is to be taken at the location, among other examples.

The method can continue to operation 284, where a dashboard user interface is generated that displays a representation of the SOP and a compliance status associated with the SOP. The dashboard user interface can display a representation of the SOP in a hierarchical manner to provide a top-down interactive view. For example, at a top level, the dashboard user interface displays areas of the facility for which the SOP has been adopted (e.g., each building of the facility). At an intermediate level, the dashboard user interface displays subareas within each area displayed at the top level (e.g., rooms within each building). At a low level, the dashboard user interface displays sampling locations within each of the subareas displayed at the intermediate level (e.g., sampling locations within each room). Examples of the dashboard user interface and levels of representation are shown and described in greater detail with reference to FIGS. 9, 10, and 11.

In some examples, the dashboard user interface can indicate that a sample is to be run at one of the sampling locations in order to maintain compliance with the SOP. For example, the sample needs to be run because, based on the time schedule, a duration between samples is about to lapse. Alternatively, the sample needs to be run because, based on the last sample, an error or excursion occurred or the duration has already lapsed. A sample can then be run by the air particle counter placed at the sampling location (e.g., operation 274 shown and described in FIG. 6 can be performed). The indication that the sample is to be run at one of the sampling locations in order to maintain compliance with the SOP can be in form of a graphical scheme applied by the dashboard user interface to the sampling location at the low level. In some examples, the graphical scheme can then be rolled up from the low level to the intermediate and top levels. For example, the graphical scheme can be applied to the subareas including the sampling location and the area including the sampling location. Therefore, a user can interact with the dashboard user interface to quickly identify which sampling location is at issue. In other examples, alerts or notifications can be provided to alert and/or notify the user of the sampling location at issue.

Figure 8B:
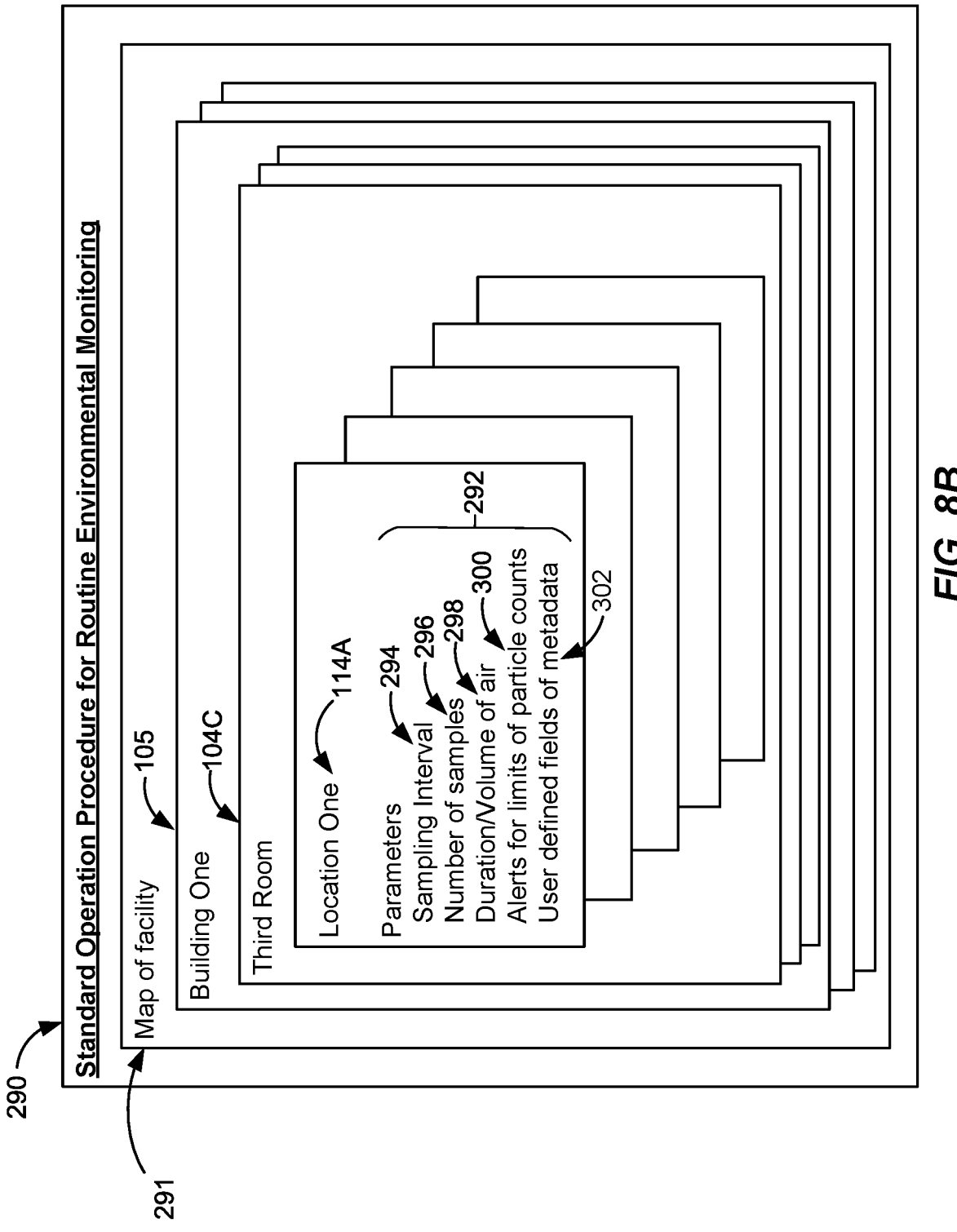
FIG. 8B depicts another example configuration of the SOP shown in FIG. 8A.

FIGS. 8A and 8B depict examples of SOP 290 adopted by a facility, such as the facility 103. FIG. 8A depicts the SOP 290 in a list format, while FIG. 8B depicts the SOP 290 in an alternative, stackable card configuration. For example, in FIG. 8A, a map 291 of the facility is outlined within the list that includes each building of a facility, rooms of each building, and sampling locations within each room. In some examples, the list is a drop-down list, such that initially only buildings of the facility are displayed, and user selection of a building causes display of the rooms of the building, and further user selection of a room of the building causes display of sampling locations of the room. In FIG. 8B, the user can perform selections on the map 291 of the facility to view buildings of the facility, rooms of the buildings, and sampling locations within the rooms, where each of the levels (e.g., buildings, rooms, and sampling locations) are provided as sets of stacked cards. For example, each building is represented by a card within a stacked set of building cards. Upon selection of a building card, each room of the corresponding building is represented by a card within a stacked set of room cards for the building. Upon selection of a room card, each sampling location within the corresponding room is represented by a card within a stacked set of sampling location cards for the room.

Referring concurrently to FIGS. 8A and 8B, the SOP 290 can include specifications 292 for each sampling location within the facility. The specifications can be dependent on a type of product manufactured or process occurring within the area or subarea (e.g., building or room) in which the sampling location is located. Additionally, in some examples, each sampling location can have different sampling specifications based on the particular location. For example, a sampling location closer to where a product is being made or a process is occurring can have different sampling specifications than a more remote sampling location further away from the product manufacturing or process, even though both sampling locations are in the same subarea.

As one example, the specifications 292 for the first sampling location 114A in the third room 104C of the first building 105 of the facility 103 include a maximum allowed interval (e.g., a duration) between samples 294, a number of samples 296, a duration of or volume of air to be collected in each sample 298, alert levels for a particle count limit 300, and other user-defined fields of metadata 302. The particle count limit 300 can include a maximum number of particles of varying sizes per cubic meter. For example, for particles greater than or equal to 0.1 micrometers, the particle limit is 10,000 particles per cubic meter. For particles greater than 0.2 micrometers, the particle limit is 2,000 particles per cubic meter. For particles greater than 0.3 micrometers, the particle limit is 1,000 particles per cubic meter. The specifications 292 shown and described are intended to be non-limiting examples, other types of information associated with the process for collecting the sample at the sampling location can also be included within the SOP. Additionally, the specifications 292 can further describe how the data from the samples collected are to be managed and/or reviewed. The other types of information and descriptions can be included within the user defined fields of metadata 302.

Figure 9:
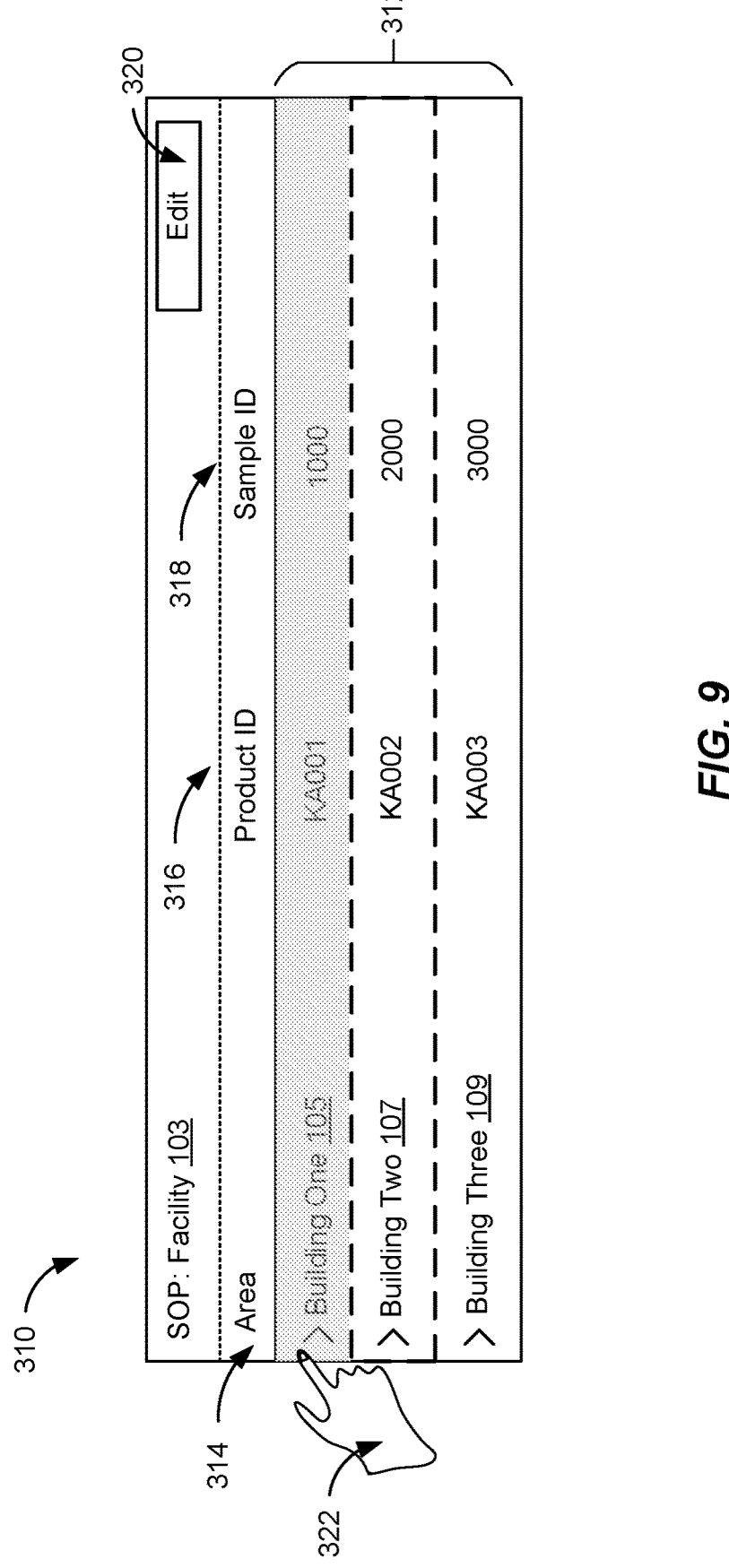
FIG. 9 depicts an example dashboard user interface displaying a top level representation of an SOP.

FIG. 9 depicts an example dashboard user interface 310 displaying a high level representation 312 of an SOP, such as SOP 290 shown and described with reference to FIG. 9. The dashboard user interface 310 can represent the SOP in a hierarchical manner to provide a top-down interactive display. For example, the high level representation 312 includes each area 314 of the facility for which the SOP has been adopted. For example, the dashboard user interface 310 displays each building of the facility 103, including the first building 105, a second building 107, and a third building 109. For each area 314, an associated product identifier 316 and sample identifier 318 can also be displayed. Additionally, a user can edit information displayed within the dashboard user interface 310 upon a selection of an edit control 320.

The dashboard user interface 310 can apply a graphical scheme to display a compliance status with the SOP. For example, a particular color, highlighting, shading, font, animation, and/or other similar graphical scheme can be used in conjunction with each area 314 displayed in the top level representation 312 to indicate whether the area 314 is compliant, non-compliant, or soon to be non-compliant. In other examples, alerts or other types of notifications can be provided alternatively or in addition to the graphical scheme when the compliance status is determined to be non-compliant or soon to be non-compliant.

As illustrated in FIG. 9, the first building 105 is shaded in the top level representation 312 to indicate the first building 105 is non-compliant with the SOP. In some examples, the first building 105 can be non-compliant when analysis of one or more samples run at one or more sampling locations within the first building 105 reveals an error and/or an excursion occurred, described in greater detail with reference to FIG. 11. In other examples, the first building 105 can be non-compliant if one or more samples to be run at sampling locations within the first building 105 have exceeded the duration between sample collections set by the specifications of the SOP (e.g., one or more samples are past due).

The second building 107 of the facility 103 is framed by a dashed-line to indicate the second building 107 is soon to be non-compliant with the SOP if no action is taken. For example, one or more samples to be run at sampling locations within the second building need to be run imminently to avoid exceeding the duration between sample collections set by the specifications of the SOP.

No graphical scheme is applied to the third building 109 to indicate the third building is in compliance with the SOP. For example, each of the samples run at sampling locations within the third building 109 do not exceed particle counts limits and the duration between sample collections is not exceeded and is not approaching imminently.

Figure 10:
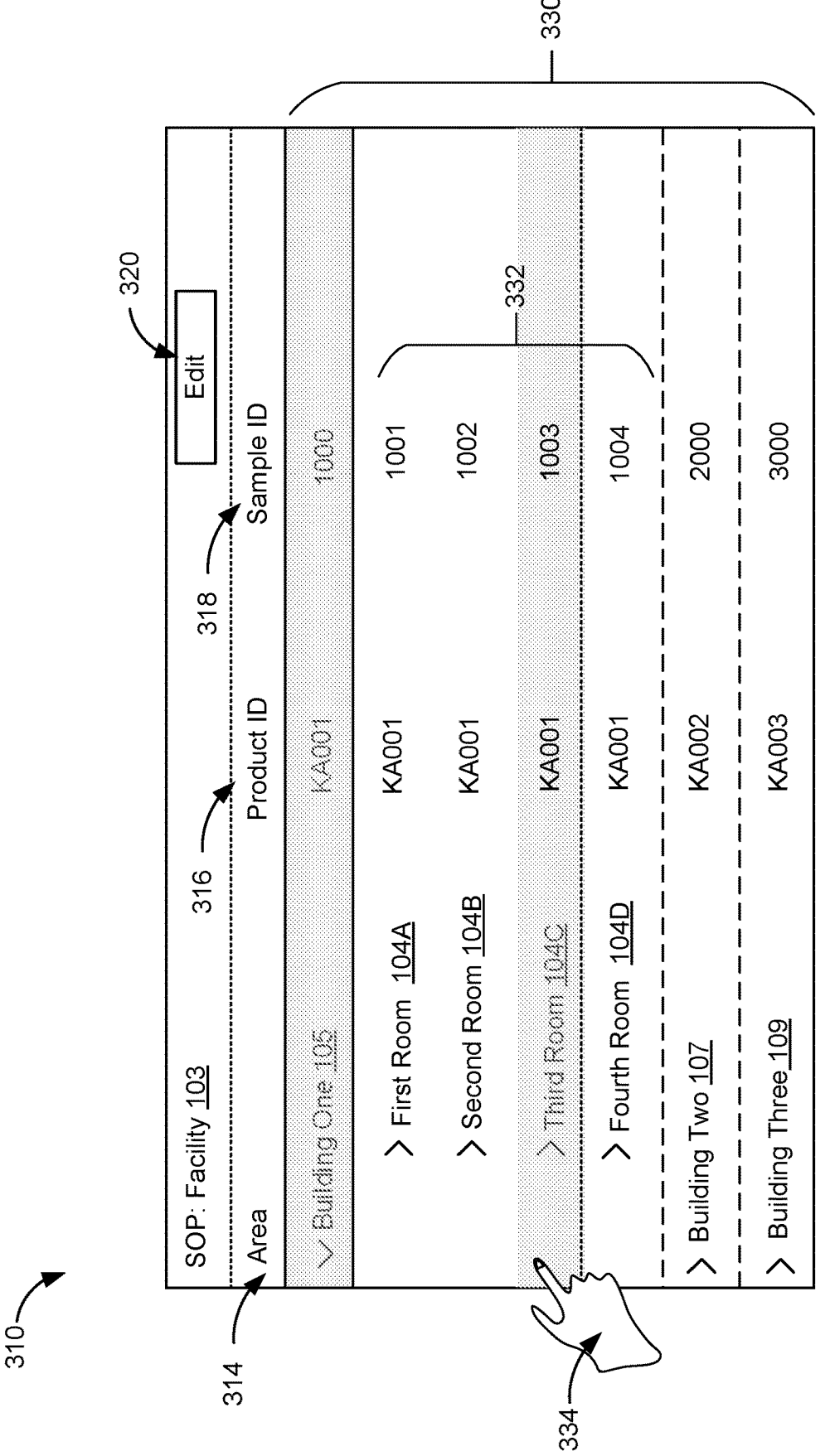
FIG. 10 depicts an example dashboard user interface displaying an intermediate level representation of an SOP.
Figure 11:
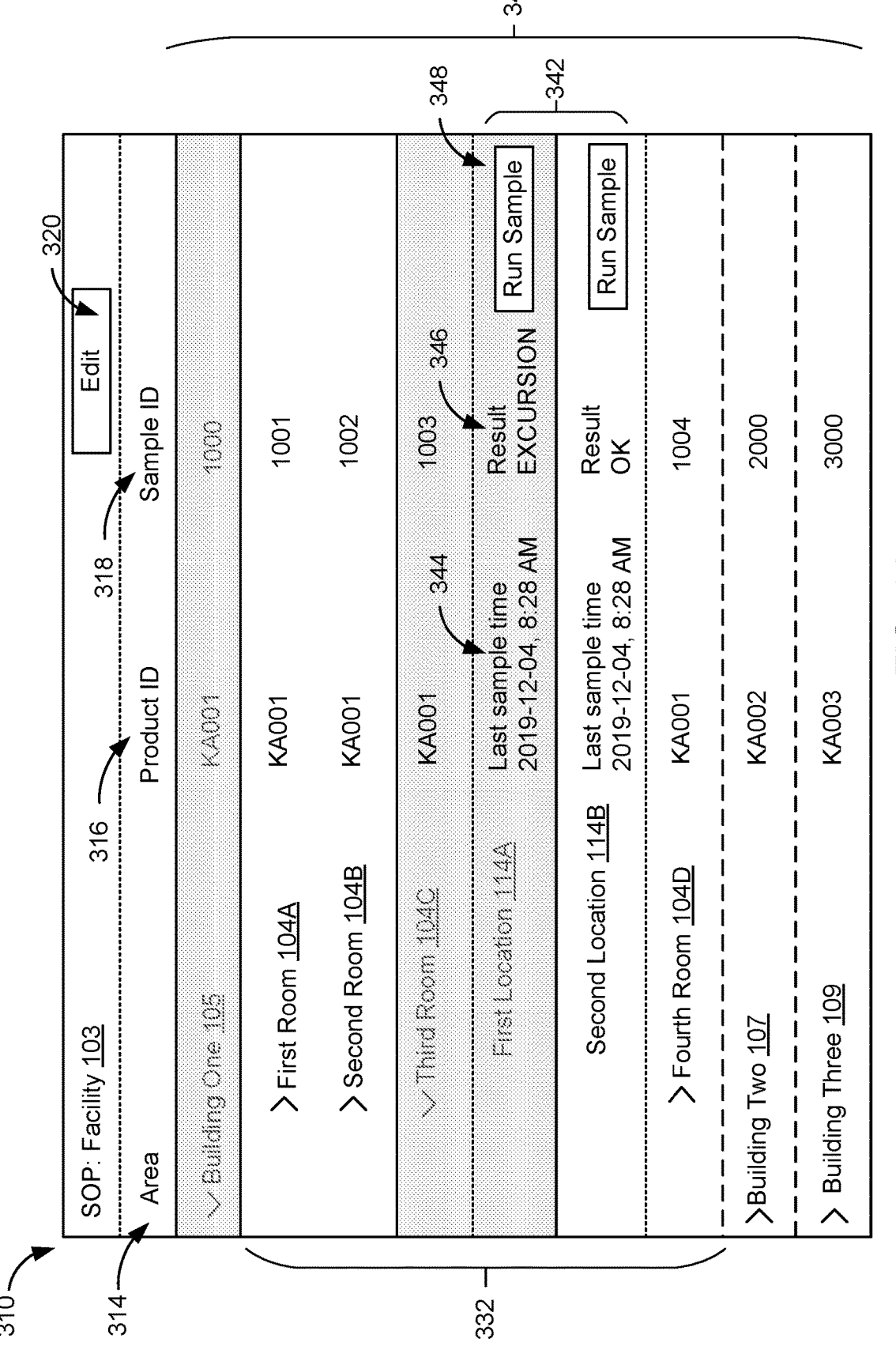
FIG. 11 depicts an example dashboard user interface displaying a low level representation of an SOP.

The above-described graphical scheme is carried throughout the hierarchy, as further illustrated in FIGS. 10 and 11, and enables a user to quickly assess current compliance. For example, if the graphical scheme indicates an area, such as the third building 109 is in compliance, the user does not have to waste time drilling down into the intermediate and lower level representations of the hierarchy to see whether samples run at sampling location within the third building 109 (e.g., samples run at each sampling location within each room of the third building 109) are compliant.

Instead, the user can efficiently select an area that, based on the graphical scheme, is indicated as non-compliant or soon to be non-compliant in order to drill to the intermediate and lower level representations of the hierarchy in order to see exactly which rooms and sampling locations within each room are at issue. For example, as illustrated, the user selects 322 the first building 105 that is indicated as non-compliant based on the graphical scheme. In response to the selection 322, an intermediate level representation of the first building 105 is displayed, as described in detail with reference to FIG. 10 below.

In some examples, if the facility 103 has adopted more than one SOP, the dashboard user interface 310 may first prompt the user to select which SOP to view and/or manage. Upon selection of the SOP, the dashboard user interface 310 can then display the high level representation 312 as illustrated in FIG. 9.

FIG. 10 depicts the example dashboard user interface 310 displaying an intermediate level representation 330 of an SOP, such as the SOP 290 shown and described with reference to FIGS. 8A and 8B. The intermediate level representation 330 includes each area 314 of the facility displayed in the high level representation 312 as shown and described with reference to FIG. 9. Additionally, the intermediate level representation 330 includes subareas 332 of one or more of the areas 314 previously selected by the user from the high level representation 312. For example, as illustrated, the subareas 332 can include rooms 104 of the first building 105, where the first building 105 was the area previously selected 322 by the user from the high level representation 312.

The graphical scheme described above with reference to FIG. 9 carries throughout the hierarchical representation. For example, the third room 104C is shaded to indicate that it is specifically the third room 104C of the first building 105 that is non-compliant with the SOP. In some examples, the third room 104C can be non-compliant when analysis of one or more samples run at sampling locations within the third room 104C reveals an error and/or an excursion occurred, described in greater detail with reference to FIG. 11. In other examples, the third room 104C can be non-compliant if one or more samples to be run at sampling locations within the third room 104C have exceeded the duration between sample collections set by the specifications of the SOP (e.g., one or more samples are past due). No graphical scheme is applied to the first room 104A, the second room 104B, or the fourth room 104D of the first building 105 to indicate that each of these rooms is in compliance with the SOP and no action is needed at this time.

As previously indicated, the graphical scheme enables the user to quickly assess current compliance. For example, if the graphical scheme indicates one or more of the subareas 332, such as the first room 104A, the second room 104B, and the fourth room 104D are in compliance, the user does not have to waste time drilling down into the lower level representations of the hierarchy to see whether sampling locations within each subarea (e.g., sampling locations within each of the first room 104A, the second room 104B, and the fourth room 104D) are compliant. Instead, the user can efficiently select an area that, based on the graphical scheme, is indicated as non-compliant or soon to be non-compliant in order to drill to the lower level representation of the hierarchy in order to see exactly which sampling locations within each room are at issue. For example, as illustrated, the user selects 334 third room 104C that is indicated as non-compliant based on the graphical scheme. In response to the selection 334, a low level representation of the third room 104C is displayed, as described in detail with reference to FIG. 11 below.

FIG. 11 depicts the example dashboard user interface 310 displaying a low level representation 340 of an SOP, such as SOP 290 shown and described with reference to FIGS. 8A and 8B. The low level representation 340 includes each area 314 of the facility displayed in the high level representation 312 shown and described with reference to FIG. 9. Additionally, the low level representation 340 includes the subareas 332 of one or more of the areas 314 previously selected by the user from the high level representation 312. For example, as illustrated, the subareas 332 can include rooms 104 of the first building 105, where the first building 105 was the area selected 322 by the user from the high level representation 312. Further, the low level representation 340 includes one or more sampling locations 342 within one or more of the subareas 332 previously selected by the user from the intermediate level representation 330 shown and described with reference to FIG. 10. For example, as illustrated, the sampling locations 342 can include the first sampling location 114A and the second sampling location 114B in the third room 104C, where the third room 104C was the subarea selected 334 by the user from the intermediate level representation 330.

A date and time 344 at which the last sample was run at the sampling location and a sample result 346 from the last sample run at the sampling location is displayed in conjunction with each of the sampling locations 342 within the low level representation 340. In some examples, the sample result 346 can indicate an error or excursion occurred. As one example, an excursion occurs when one or more particle count limits for the particular sampling location have been exceeded. As another example, an error can be associated with a malfunction of the air particle counter used to capture and analyze the sample and/or other similar error affecting the analysis of the sample. Otherwise, if no error has occurred, the sample results 346 can indicate that the sample is OK, for example.

The graphical scheme described above with reference to FIGS. 9 and 10 carries throughout the hierarchical representation. For example, the first sampling location 114A within the third room 104C is shaded to indicate that it is specifically the first sampling location 114A within the third room 104C of the first building 105 that is non-compliant with the SOP. In some examples, the first sampling location 114A can be non-compliant if a last sample run at the first sampling location 114A exceeded particle count limits set by the specifications of the SOP. In other examples, the first sampling location 114A can be non-compliant if a time since the last sample was run at first sampling location 114A exceeds the duration between sample collections set by the specifications of the SOP (e.g., one or more samples are past due). No graphical scheme is applied to the second sampling location 114B within the third room 104C of the first building 105 to indicate that the second sampling location 114B is in compliance with the SOP and no action is needed at this time.

The low level representation 340 can further include a run control 348 associated with each of the sampling location 342 that enables the user to activate running of a sample by an air particle counter 106 at the respective sampling locations 342. For example, to remedy the non-compliance with the SOP at the first sampling location 114A, the user can select the run sample control 348 associated with the first sampling location 114A. In response to the selection, a sample can be run by the air particle counter at the first sampling location 114A, as described in detail below with reference to FIG. 12.

Figure 12:
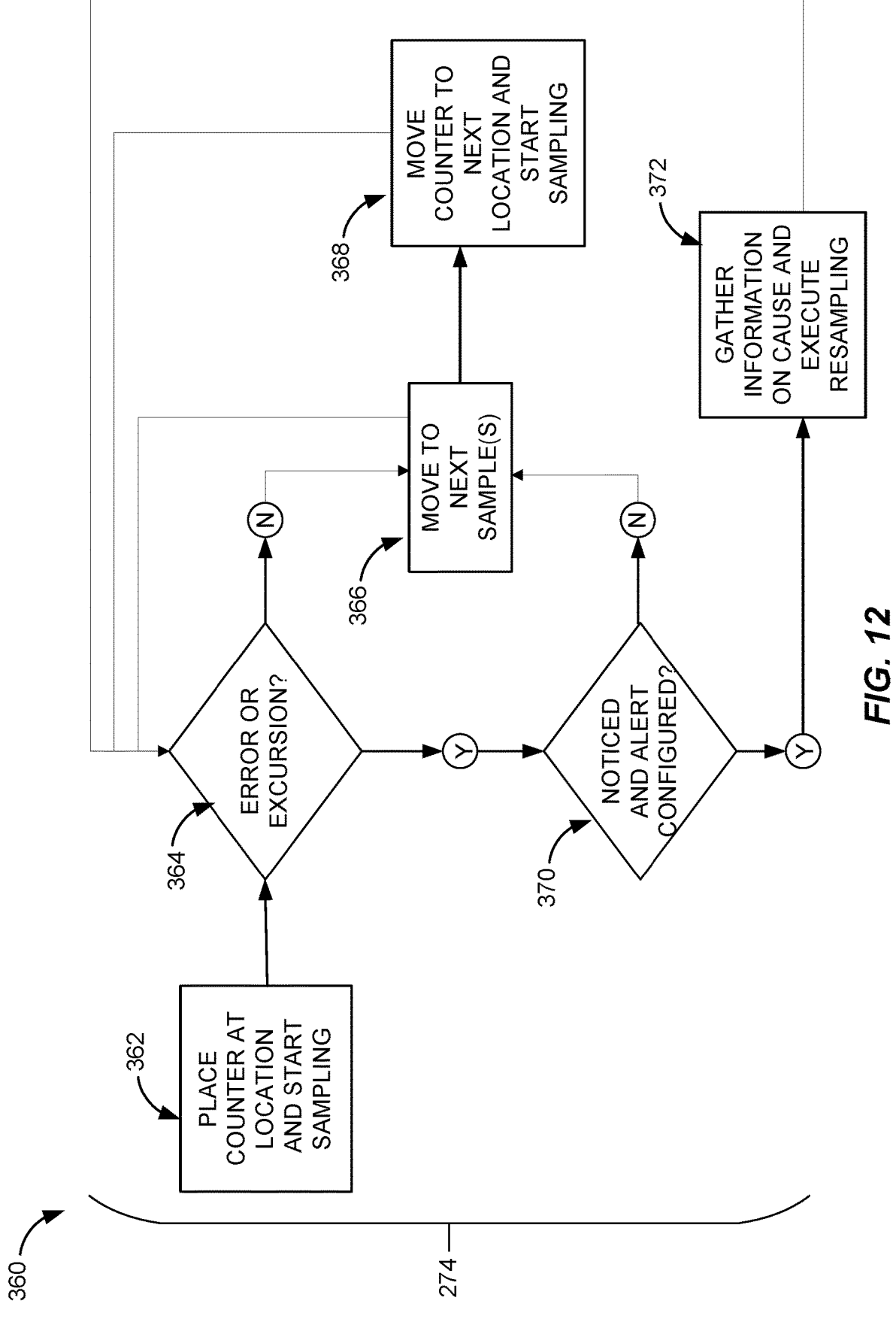
FIG. 12 is a flowchart illustrating an example method for running a sample based on an SOP.

FIG. 12 is a flowchart illustrating an example method 360 for running a sample based on an SOP, such as the SOP 290 shown and described with reference to FIGS. 8A and 8B. In some examples, the method 360 can be used to at least partially perform the operation 274 shown in FIG. 6. Method 360 begins at operation 362, where a monitoring devices, such as an air particle counter 106 shown and described with reference to FIGS. 1-3, is placed at a sampling location and sampling is started. For example, when the air particle counter is a portable unit, a technician transporting the portable unit can enter an area or a subarea including the sampling location and position the air particle counter as specified by the SOP. Alternatively, the air particle counter or portions thereof can be installed (e.g., fixed) at the sampling location. In some examples, the sampling locations each include a machine-readable code, such as a barcode, a QR code, or a radio frequency tag, among other similar codes, that is read or scanned prior to sampling to verify the location at which the sample is being taken. The machine-readable code can be read or scanner via a scanner integrated with the air particle counters or a separate scanner communicatively coupled to the air particle counters. In other examples, a global positional system (GPS) and/or a land navigation system is employed to determine and verify the location.

In some examples, the technician can start the sampling by activating the air particle counter. For example, the technician can push the power button 128 to turn on the air particle counter and select a start control on a sampling interface presented on a display of the air particle counter (e.g., the display 130 of the air particle counter 106). In other examples, the air particle counter is activated remotely, rather than manually by the technician. For example, sampling can be activated through a remote computing device, such as the computing device 108, through which the sampling interface is provided. More than one air particle counter can be placed within more than one sampling location within the area or subarea to run multiple samples at substantially the same time. However, for clarity, only one air particle counter is discussed with respect to FIG. 12.

As the sample is being run by the air particle counter, a decision of whether an error or an excursion has occurred is made at decision 364. An excursion can occur when the sample exceeds one or more particle count limits set by the SOP specifications for the sampling location 114 occurs. An error can include malfunctions associated with one or more components of the air particle counter and/or other similar errors affecting the analysis of the sample captured by the air particle counter.

If based on decision 364, no error and no excursion have occurred, the air particle counter is instructed to capture a next sample at operation 366 and return to decision 364 if any additional samples are required based on SOP specifications for the sampling location. This process can repeat until all required samples have been captured with no determined errors or excursions. Then, the air particle counter can be moved to a next sampling location and sampling can be started at operation 368. The method 360 returns to decision 364 with regard to samples captured at the next sampling location.

If based on decision 364, an error and/or an excursion have occurred, the method 360 continues to decision 370, where a determination of whether the error and/or the excursion was noticed and an alert was configured is made. For example, if the error and/or excursion was noticed, alerts or notifications can be provided through the sampling interface to alert and/or notify the user of the error. For example, if an excursion occurs, an alert can prompt for shut down of production and/or processes within the room until a particle contamination level in the air is reduced.

If based on decision 370, the error and/or the excursion was not noticed and the alert was not configured, the air particle counter captures a next sample and returns to decision 364 if any additional samples are required based on the SOP specifications for the sampling location. This process can repeat until all required samples have been captured with no determined errors or excursions and/or all required samples have been captured and any determined errors and/or excursions were not noticed and no alert was configured. Then, the air particle counter can be moved to a next sampling location and sampling can be started at operation 368. The method 360 returns to decision 364 with regard to samples captured at the next sampling location.

If based on decision 370, the error and/or the excursion was noticed and an alert was configured, information can be gathered on the cause and the sampling location at which the air particle counter was placed at operation 362 is resampled at operation 372. In some examples, the information gathered on cause can be used during analysis to identify a justification, as well as a remediation for the cause, as described in greater detail with reference to FIG. 18. The method 360 then returns to decision 364, where a decision of whether an error or an excursion has occurred is made with regard to the re-run sample. This process can continue and repeat as previously described until all required samples have been captured with no determined errors or excursions and/or all required samples have been captured and any determined errors and/or excursions were not noticed and no alert was configured. Then, the air particle counter can be moved to a next sampling location and sampling can be started at operation 368. The method 360 returns to decision 364 with regard to samples captured at the next sampling location.

Figure 13:
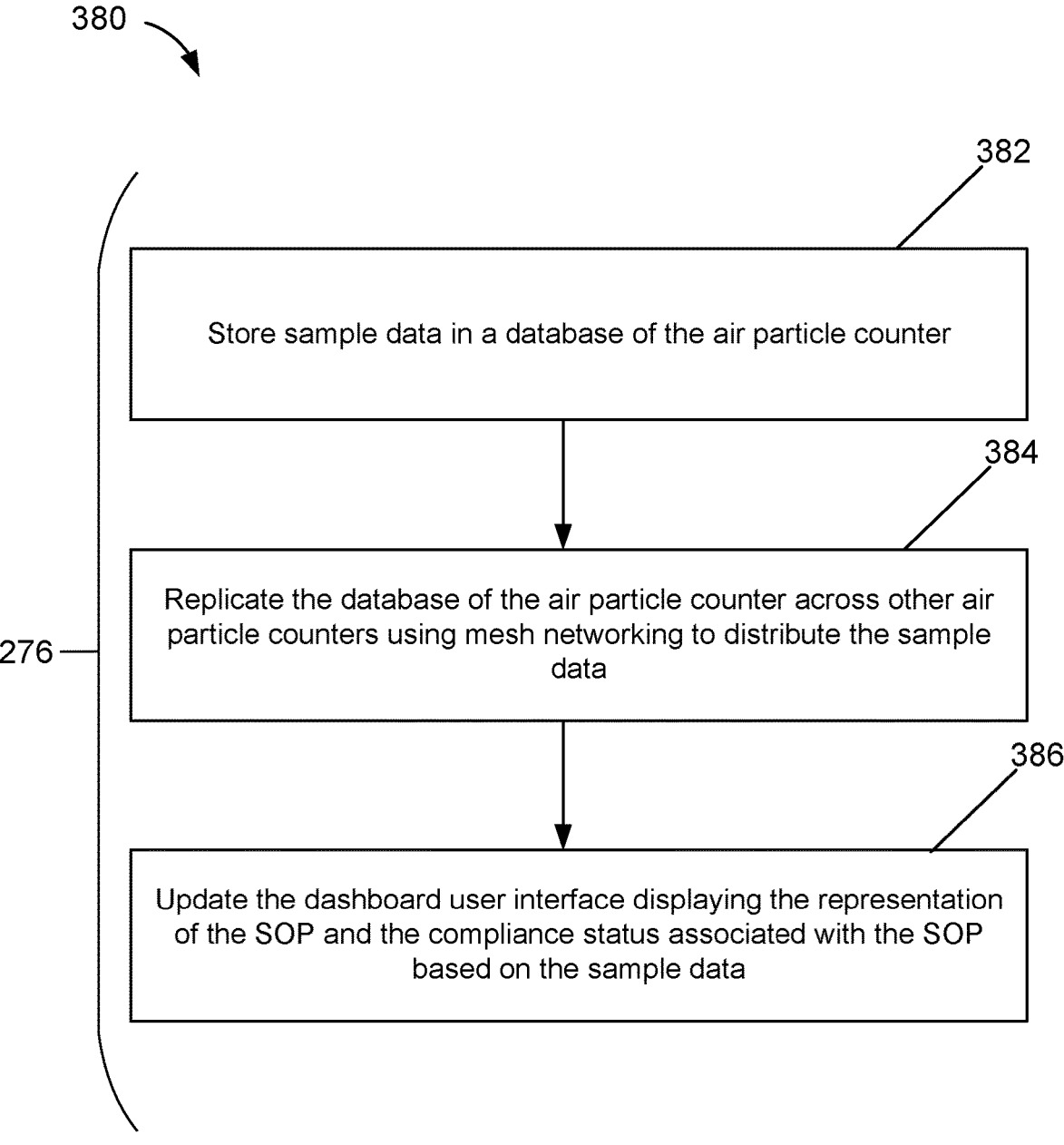
FIG. 13 is a flowchart illustrating an example method for storing and distributing sample data using mesh networking.

FIG. 13 is a flowchart illustrating an example method 380 for storing and distributing sample data using mesh networking. In some examples, the method 380 can be used to at least partially perform the operation 276 shown in FIG. 6. Method 380 begins at operation 382, where sample data is stored in a database of a monitoring device, such as the air particle counter, that ran the sample. For example, the air particle counter 106 shown and described with reference to FIGS. 1-3 ran the sample, and the sample data can be stored in the database 156 of the air particle counter 106. As a non-limiting example, the sample data can include a sample identifier, a sampling location at which the sample was taken, a date and a time the sample was taken, an identifier of the air particle counter that ran the sample, counts of particles of various sizes in the sample, an air temperature of the sample, a humidity of the sample, and a velocity of the sample. In some examples, the sample data can also include an error log that includes errors detected by the air particle counter (e.g., if the air particle counter malfunctioned).

The method 380 proceeds from operation 382 to operation 384, where the database of the air particle counter is synchronized across the mesh network 100 to distribute the sample data. For example, the database can be replicated across one or more peers, including other air particles within the facility, using the mesh networking to distribute the sample data. Accordingly, each air particle counter can have a complete database that includes sample data collected by the respective air particle counter itself, as well sample data collected by each of the other air particle counters used in the facility. Similar synchronization or replication can be performed upon receipt of the SOP, as well as any subsequent updates or new SOPs, by at least one of the air particle counters such that each air particle is configured with the current version of the SOP.

Synchronization of sample data and new or updated SOPs can occur in real-time. In some examples, sample data and new or updated SOPs representing a change to an air particle counter's database are transactionalized. Therefore, when the database of the air particle counter is replicated across peers of the mesh network 100, the transactions are provided to the peers, and the peers can compare the transactions to their own databases to determine whether they already have a copy of the sample data and/or new or updated SOP. If they do not, then the peers can store the copy in their individual databases. Similarly, the air particle counter can receive transactions representing sample data for samples run by or new and/or updated SOPs received at one or more of the other peers over the mesh network 100. The air particle counter can then compare the transactions to its own database to determine whether it already has a copy of the sample data and/or the new or updated SOP. If the air particle counter does not, then the air particle counter stores the copy in its individual database.

The method 380 proceeds from operation 384 to operation 386, where the dashboard user interface 310 shown and described with reference to FIGS. 9, 10, and 11 is updated to display the representation of the SOP and the compliance status associated therewith based on the sample data. For example, as shown and described with reference to FIG. 11, the last sample time 344 and the sample result 346 associated with the sampling location can be updated within the low level representation 340 of the dashboard user interface 310. Additionally, the graphical scheme applied to the sampling location within the low level representation 340 can be updated, and rolled up to the intermediate and high level representations. For example, if the particle counts in the record are below the limits set by the specifications of the SOP and no errors were detected, then no graphical scheme can be applied to indicate the sampling location is in compliance with the SOP. Alternatively, if the particle counts exceed the limits and/or errors were detected, than a graphical scheme such as shading can be applied to provide a visual alert that the sampling location is non-compliant with the SOP.

Figure 14:
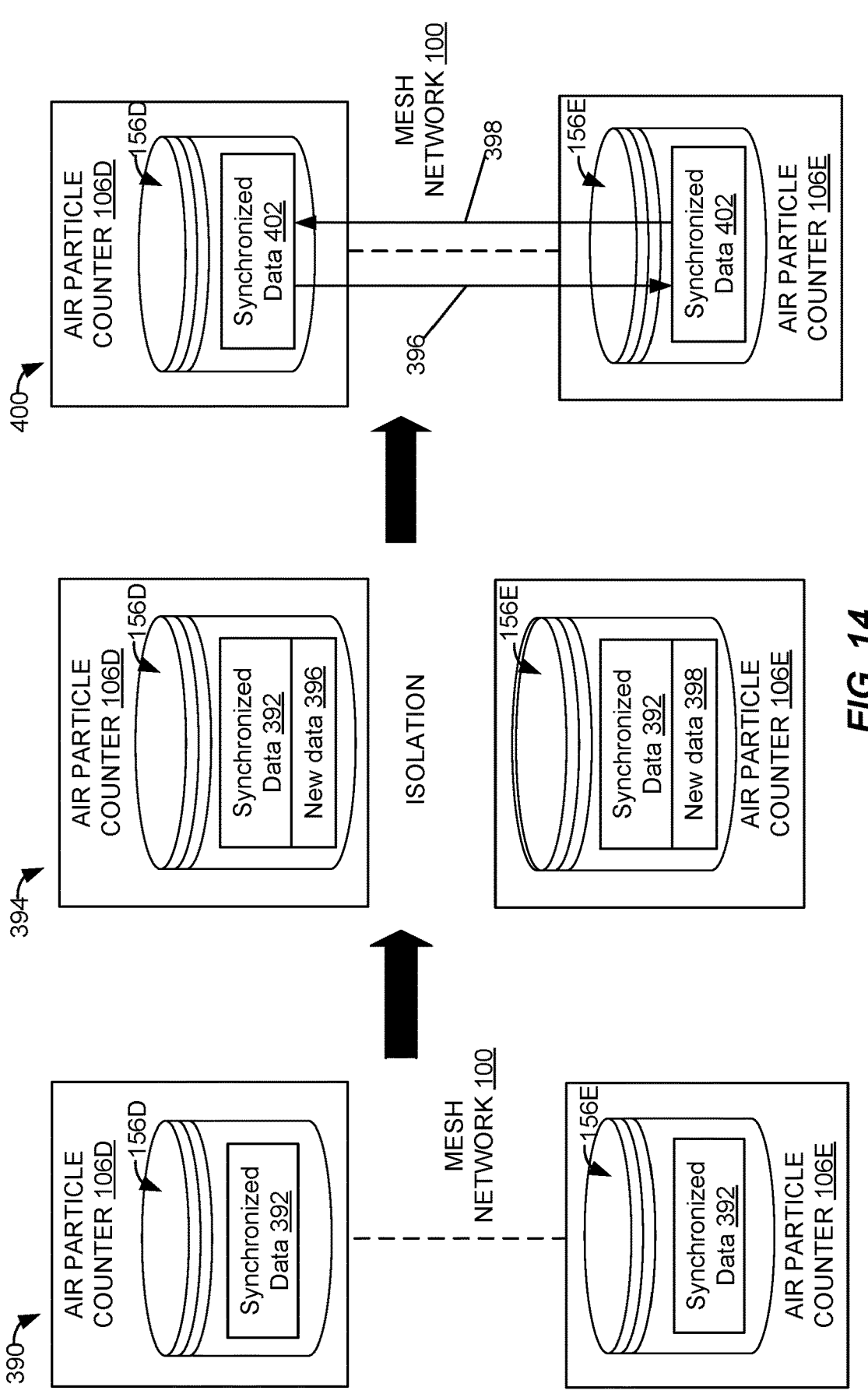
FIG. 14 schematically illustrates synchronization of an air particle counter database using mesh networking.

FIG. 14 schematically illustrates synchronization of an air particle counter database using mesh networking. As shown in diagram 390, a first air particle counter, such as air particle counter 106D, and a second air particle counter, such as air particle counter 106E, are peers that are connected to one another over the mesh network 100. For example, the air particle counters 106D and 106E include wireless transceivers that conform to the IEEE 802.11s protocol, and the air particle counters 106D and 106E are within range to communicate using mesh networking. Many additional air particle counters, as well as other remote computing devices, can also be peers connected to each other over the mesh network 100. However, for clarity, the interaction between two air particles counters 106D and 106E is shown and described herein.

While connected over the mesh network 100, a database 156D of the air particle counter 106D and a database 156E of the air particle counter 106E each include a set of synchronized data 392. The synchronized data 392 can include sample data for samples run by each of the air particle counters 106D and 106E. For example, once a sample is run by the air particle counter 106D and sample data is stored in the database 156D of the air particle counter 106D, then the database 156D of the air particle counter 106D is synchronized with the air particle counter 106E over the mesh network 100. Similarly, once a sample is run by the air particle counter 106E and sample data is stored in the database 156E of the air particle counter 106E, then the database 156E of the air particle counter 106E is synchronized with the air particle counter 106D over the mesh network 100. In some examples, synchronization involves replication of the respective database 156D or database 156E to distribute the sample data using the mesh networking. The synchronized data 392 can also include one or more SOPs, such as SOP 290. If any new SOPs or updates to existing SOPs are received at the air particle counters 106D or 106E, the updated SOP can be stored in the respective database 156D or 156E and synchronized as discussed above with reference to the sample data.

In some examples, the air particle counters 106D and 106E become isolated or disconnected from one another and/or the mesh network 100, as shown in diagram 394. As one example, when one or both of the air particle counters 106D and 106E are brought into cleanrooms that lack radio communications, the air particle counters 106D and 106E become disconnected from the mesh network 100 and from each other. As another example, when air particle counter 106E is a stationary air particle counter that is out of range from the mesh network 100, air particle counter 106E is only capable of connecting to the mesh network 100 when a portable air particle counter, such as the air particle counter 106D, comes into proximity to communicate with stationary air particle counter 106E. As a further example, the air particle counters 106D and 106E each communicate with a third instrument (e.g., another air particle counter). If the air particle counters 106D and 106E cannot reach each other, they are dependent on the third instrument for synchronization. If the third instrument becomes disconnected from the mesh network 100 or goes offline for any other reason, the air particle counters 106D and 106E will become isolated.

As a yet further example, the air particle counters 106D and 106E may simply no longer be in range of one another for communication over the mesh network 100.

Despite the isolation and lack of connectivity, because each of the air particle counters 106D and 106E has an independent set of the synchronized data 392, including the current version of the SOP and sample data from previously run samples, the environmental monitoring (e.g., the sampling, as well as tracking and management of the sample related data) can be fully operative to insure compliance.

If the air particle counter 106D runs any samples during the isolation and/or receives any new SOPs or updates to existing SOPs during the isolation, sample data for the samples and/or the new SOPs or updates to existing SOPs are stored in the database 156D of the air particle counter 106D, referred to collectively as new data 396 stored during isolation. In some examples, the new data 396 is stored as a transaction. Due to isolation from the air particle counter 106E, no synchronization occurs between database 156D and database 156E, rather the new data 396 stored during isolation is simply maintained at the database 156D until the air particle counter 106D is reconnected to the air particle counter 106E over the mesh network 100.

Similarly, if the air particle counter 106E runs any samples during the isolation and/or receives any new SOPs or updates to existing SOPs during the isolation, sample data for the samples and/or the new SOPs or updates to existing SOPs are stored in the database 156E of the air particle counter 106E, referred to collectively as new data 398 stored during isolation. In some examples, the new data 398 is stored as a transaction. Due to isolation from the air particle counter 106D, no synchronization occurs between database 156E and database 156D, rather the new data 398 stored during isolation is simply maintained at the database 156E until the air particle counter 106E is reconnected with the air particle counter 106D.

In some examples, the new data 396 and 398 stored during isolation are stored separately from the previously synchronized data 392 within the databases 156D and 156E. As previously described the new data 396 and 398 can be stored as transactions. Separate storage can allow more efficient synchronization (e.g., less processing) once the air particle counters 106D and 106E are reconnected to one another over the mesh network 100. For example, as shown in diagram 400, once the air particle counters 106D 106E are reconnected to each other over the mesh network 100, the database 156D is replicated (e.g., including the synchronized data 392 and new data 396) and distributed to the air particle counter 106E using the mesh networking. Recognizing that the database 156E does not include the transaction representing the new data 396, the air particle counter 106E stores the new data 396 along with the previously synchronized data 392 and the new data 398 within the database 156E resulting in a new set of synchronized data 402. Similarly, the database 156E is replicated (e.g., including the synchronized data 392 and new data 398) and distributed to the air particle counter 106D using the mesh networking. Recognizing that the database 156D does not include the transaction representing the new data 398, the air particle counter 106D stores the new data 398 along with the previously synchronized data 392 and the new data 396 within the database 156D resulting in the new set of synchronized data 402. Accordingly, each of the databases 156D and 156E now have the new set of synchronized data 402 that includes the previously synchronized data 392 prior to isolation, and both sets of the new data 396 and 398 stored during isolation.

Figure 15:
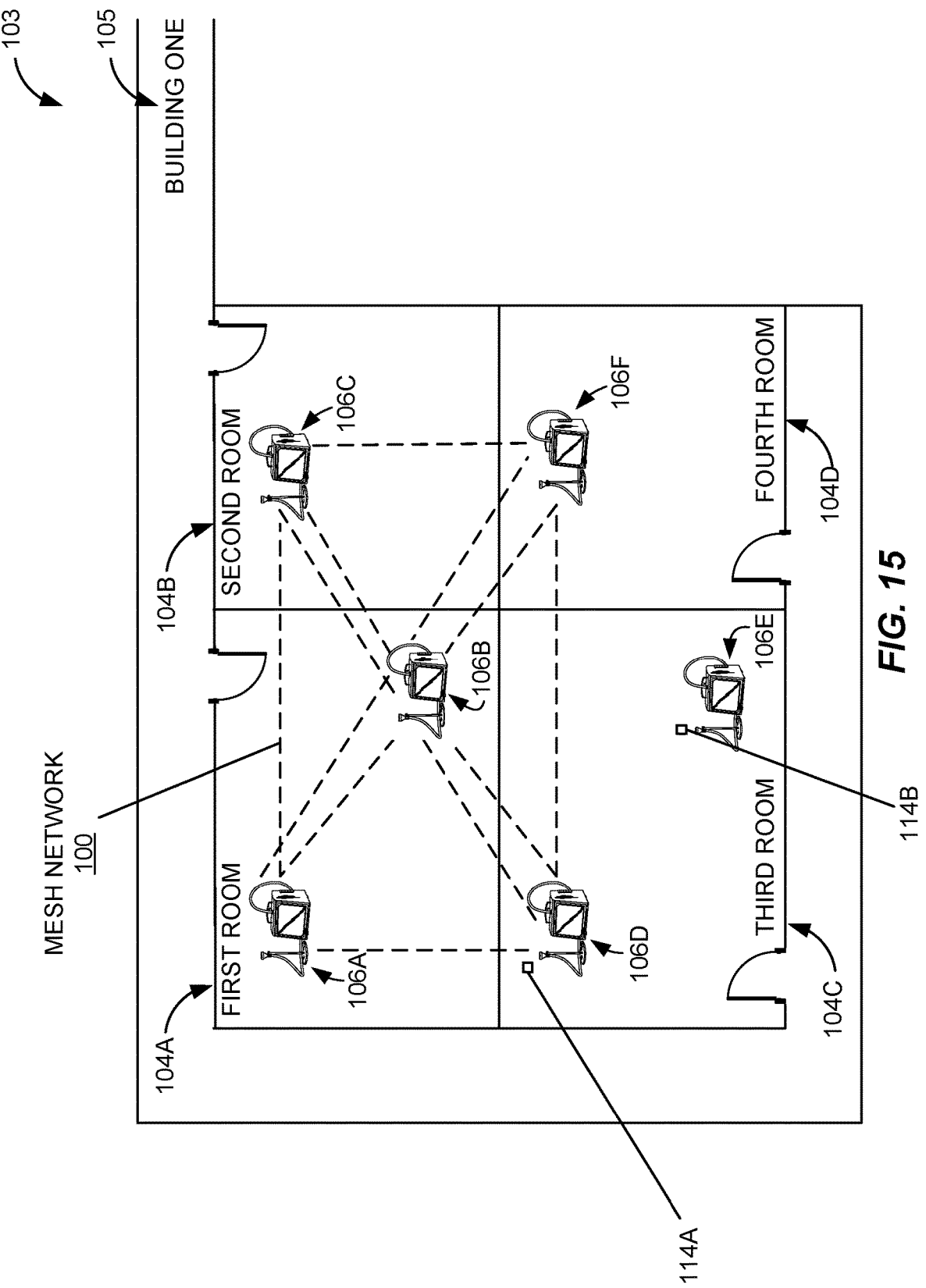
FIG. 15 schematically illustrates isolation of an air particle counter from a mesh network.

FIG. 15 schematically illustrates isolation of an air particle counter, such as air particle counter 106E, from a mesh network 100. Each of the plurality of air particle counters 106 (e.g., 106A, 106B, 106C, 106D, 106E, and 106F) used within the first building 105 of the facility 103 to capture samples for environmental monitoring can be wireless mesh network devices that conform to the IEEE 802.11s protocol that form the mesh network 100 with each other when in range. As illustrated, the air particle 106E is isolated from the mesh network 100. In other words, the air particle counter 106E is not connected to any one of the other air particle counters 106.

Prior to isolation (e.g., while previously connected to the mesh network 100), the database 156E of the air particle counter 106E includes a set of synchronized data. The set of synchronized data includes sample data for samples run by each of the air particle counters and one or more SOPs. The set of synchronized data stored is substantially the same among the databases 156 of each of the air particle counters 106. Accordingly, each of the air particle counters 106, including now isolated air particle counter 106E, has a complete and independent set of synchronized data within its database 156, rather than a central or master database from which each of the air particle counters 106 transmit data to and obtain data from. Thus, even when isolated, the complete and independent set of synchronized data enables fully operative environmental monitoring (e.g., fully operative sampling, as well as tracking and management of the sample related data to maintain compliance) despite the lack of connectivity.

While isolated, if a sample is run by the air particle counter 106E, sample data is stored in the database 156E of the air particle counter 106E. Similarly, if any new SOPs or updates to existing SOPs are received at the air particle counter 106E, the updated SOP is stored in the database 156E of the air particle counter 106E. In some examples, the sample data and new or updated SOPs stored during isolation are stored separately from the set of synchronized data within the database 156E (e.g., stored as transactions). Separate storage can allow more efficient synchronization when the air particle counter 106E is reconnected.

Once the air particle counter 106E reconnects to at least one other air particle counter over the mesh network 100, the database 156E is synchronized with the at least one other air particle counter to distribute the sample data and new or updated SOPs stored during isolation (e.g., via replication of the database 156E as described in detail with reference to FIG. 14). The at least one other air particle counter can then distribute the sample data and new or updated SOPs stored during isolation across additional air particle counters using the mesh networking (e.g., through daisy-chaining or direct database replication). Additionally, upon reconnection to at least one other air particle counter over the mesh network 100, the air particle counter 106E receives sample data for samples run by and new or updated SOPs received at the other air particle counters while the air particle counter 106E was isolated. For example, the database 156D of the air particle counter 106D is replicated and distributed to the air particle counter 106E using the mesh networking.

Figure 16:
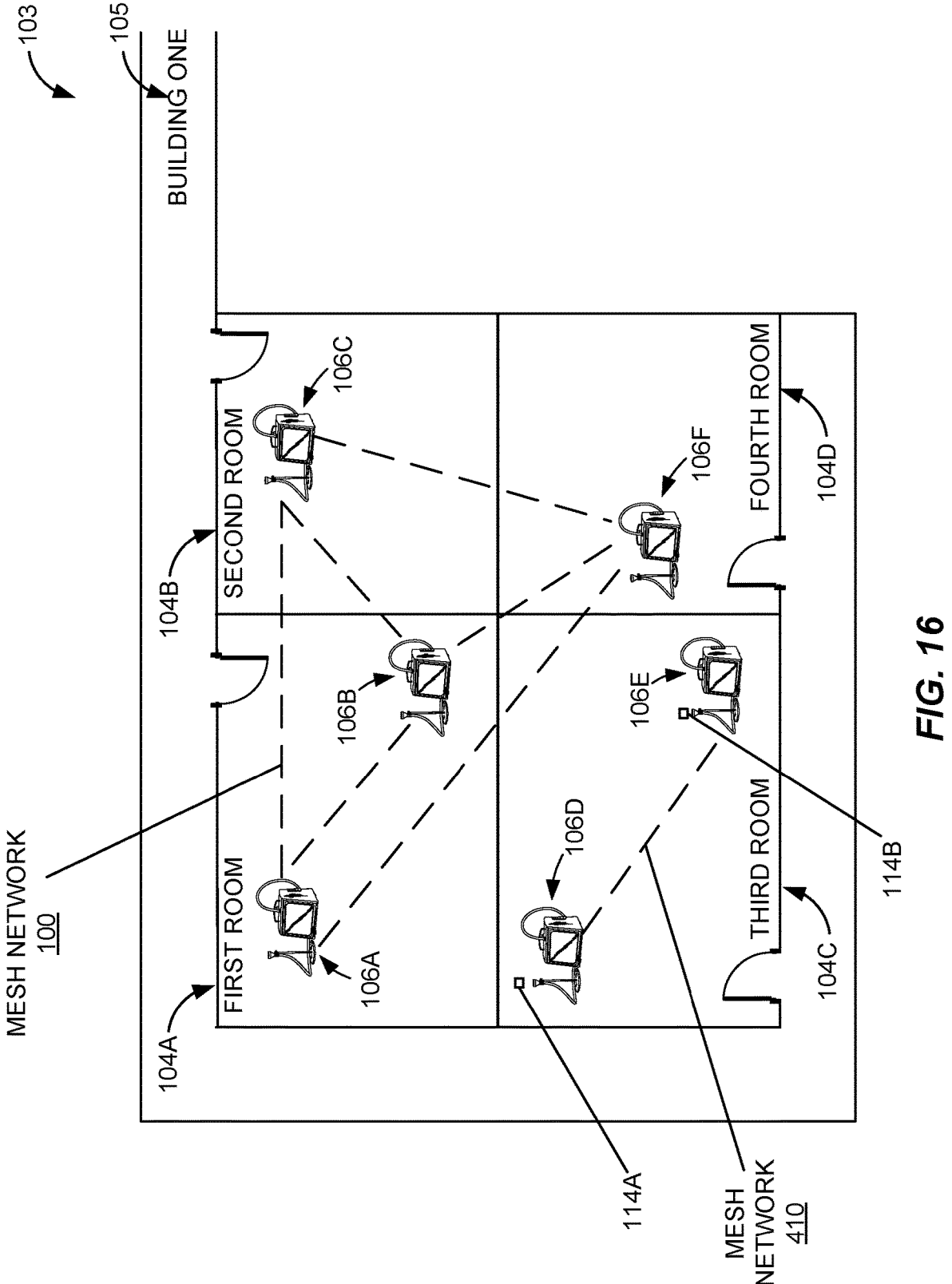
FIG. 16 schematically illustrates a group of isolated air particle counters from a mesh network.

FIG. 16 schematically illustrates a group of isolated air particle counters from a mesh network 100. The air particle counters 106D and 106E include wireless mesh network devices that are capable of connecting to the mesh network 100. Currently, the air particle counters 106D and 106E are isolated or disconnected from the mesh network 100. However, the air particle counters 106D and 106E remain connected to one another over a separate mesh network 410.

Thus, the air particle counters 106D and 106E can continue to communicate with one another over the separate mesh network 410 to distribute sample data run by and new or updated SOPs received at the air particle counters 106D and 106E for storage within databases 156D and 156E. Accordingly, the databases 156D and 156E will have substantially the same set of data.

Once at least one of the air particle counters 106D and 106E becomes reconnected to at least one other air particle counter of the mesh network 100 (e.g., one of the air particle counters 106A, 106B, 106C, and 106F), the air particle counters 106D and 106E are both capable of distributing data across the air particle counters of the mesh network 100 using daisy-chaining as described with reference to FIG. 17 below.

Figure 17:
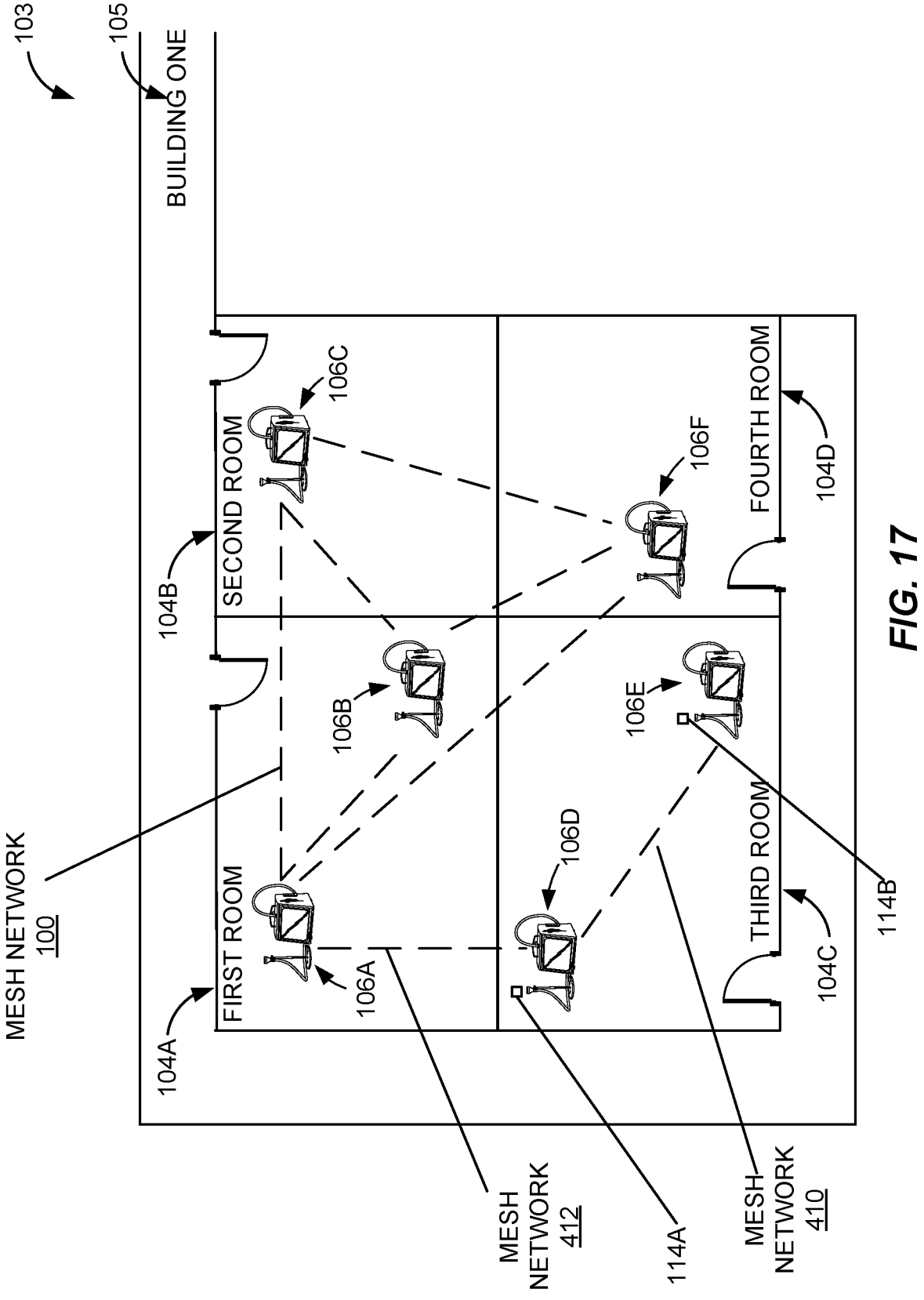
FIG. 17 schematically illustrates daisy-chaining in mesh networking.

FIG. 17 schematically illustrates daisy chaining in mesh networking. Continuing with the example scenario with reference to FIG. 16, air particle counters 106D and 106E are connected to one another over the mesh network 410 but are isolated from other air particle counters 106A, 106B, 106C, and 106F that are connected to each other over the mesh network 100. However, once in range, the air particle counter 106D can then connect with air particle counter 106A over another separate mesh network 412 to create a daisy-chain to the mesh network 100. The daisy-chain effectively enables the air particle counters 106D and 106E to distribute data to and receive data from other air particle counters 106 A, 106B, 106C, and 106F. For example, any sample data run and new or updated SOPs received at air particle counter 106E and stored in database 156E of the air particle counter 106E can be distributed to the air particle counter 106D over the mesh network 410 (e.g., via replication of the database 156E). The distributed data can be stored in the database 156D of the air particle counter 106D. Thus, the database 156D includes samples run by and new or updated SOPs received at both of the air particle counters 106D and 106E.

The samples run by and new or updated SOPs received at both of the air particle counters 106D and 106E can then be distributed to air particle counter 106A over the mesh network 412 (e.g., via replication of database 156D of the air particle counters 106D). The distributed data can be stored in the database 156A of the air particle counter 106A. Thus, the database 156A now includes samples run by and new or updated SOPs received at both of the air particle counters 106D and 106E.

The database 156A can then be replicated across the other air particle counters 106B, 106C, and 106F of the mesh network 100 to distribute the samples run by and new or updated SOPs received at both of the air particle counters 106D and 106E. Accordingly, each of the other air particle counters 106B, 106C, and 106F can store the distributed data within its respective database such that each database now includes the samples run by and new or updated SOPs received at both of the air particle counters 106D and 106E.

Additionally, because the air particle counters 106A, 106B, 106C, and 106F are connected over mesh network 100, each database of air particle counters 106A, 106B, 106C, and 106F can further include the samples run by and new or updated SOPs received at any of the air particle counters 106A, 106B, 106C, and 106F. For example, the database 156A includes samples run by and new or updated SOPs received at any of the air particle counters 106A, 106B, 106C, and 106F. Thus, the database 156A can be replicated to distribute the samples run by and the new or updated SOPs received at any of the air particle counters 106A, 106B, 106C, and 106F to the air particle counter 106D over the mesh network 412. The distributed data can be stored in the database 156D of the air particle counter 106D. Thus, in addition to the samples run by and new or updated SOPs received at both of the air particle counters 106D and 106E, the database 156D can also include the samples run by and the new or updated SOPs received at any of the air particle counters 106A, 106B, 106C, and 106F.

The database 156D of the air particle counter 106D can then be replicated to distribute the samples run by and the new or updated SOPs received at any of the air particle counters 106A, 106B, 106C, 106D, and 106F to the air particle counter 106E over the mesh network 410. The distributed data can be stored in the database 156E of the air particle counter 106E. Thus, the database 156E now includes the samples run by and the new or updated SOPs received at any of the air particle counters 106A, 106B, 106C, 106D, and 106F, in addition to the samples run by and the new or updated SOPs received at the air particle counter 106E.

Based on the daisy-chaining, each of the air particle counters 106 now has a complete database storing samples run by and the new or updated SOPs received at any of the air particle counters 106A, 106B, 106C, 106D, 106E, and 106F.

Figure 18:
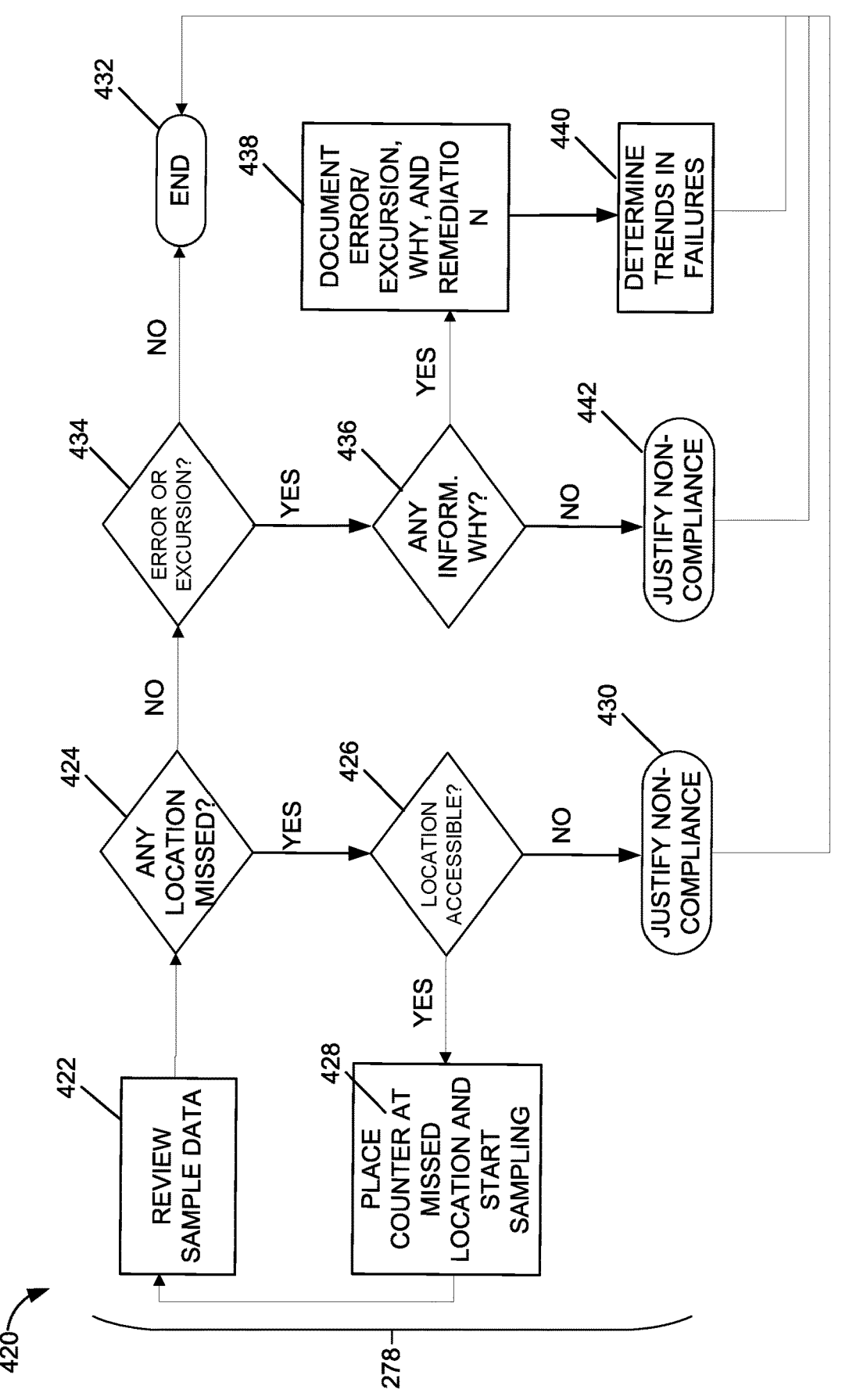
FIG. 18 is a flowchart illustrating an example method for analyzing sample data in view of an SOP.

FIG. 18 a flowchart illustrating an example method 420 for analyzing sample data in view of an SOP, such as SOP 290 shown and described with reference to FIGS. 8A and 8B. In some examples, the method 420 can be used to at least partially perform the operation 278 shown in FIG. 6. Method 420 begins at operation 382, where sample data is reviewed. In some examples, a software program integrated with the facility monitoring application can be executed to automatically review the sample data. In other examples, a user, such as the user 110, can manually review the sample data. As part of the review, a first determination of whether any sampling location specified by the SOP was missed is made at decision 424. For example, as determination is made whether a sample was captured at each sampling location specified by the SOP.

If at decision 424, a determination is made that a sampling location was missed, then a further determination of whether the missed sampling location is accessible is made at decision 426. In some examples, accessibility of the missed sampling location can be dependent on whether products are currently being produced and/or processes are being performed in an area or subarea in which the missed sampling location is located. If at decision 426, the missed sampling location is determined to be accessible, a monitoring device, such as an air particle counter, can be placed at the missed sampling location and the sampling can be started at operation 428. Operation 428 can be similar to operation 362 of method 360 described with reference to FIG. 12. Once the sample is run by the air particle counter at the missed sampling location, the method 420 can then return to operation 422, where sample data can be reviewed.

If at decision 426, the missed sampling location is determined to not be accessible, non-compliance with the SOP is justified at operation 430. Justification can include notation of why the sampling location was missed and/or a sample could not be run upon determining that the sampling location was missed. For example, the justification can include that a product was being manufactured or a process was being performed in the area or subarea where the missed sampling location is located, which prevented a sample from being collected. Upon justifying the non-compliance with the SOP at operation 430, the method 420 can then end at operation 432.

If at decision 424, a determination is made that no sampling locations were missed, method 420 continues to decision 434, where a determination of whether an error and/or an excursion occurred at any of the sampling locations is made. An excursion occurs when a sample run at a sampling location indicates one or more particle count limits set by the SOP specifications for the sampling location have been exceeded. An error can include malfunctions associated with one or more components of the monitoring devices (e.g., air particle counters) and/or other similar errors affecting the analysis of the samples captured.

If at decision 434 a determination is made that an error and/or an excursion occurred at one or more of the sampling locations, method 420 continues to decision 436, where a determination of whether any information is available as to why the error and/or an excursion occurred at the one or more sampling locations. For example, if an excursion occurred at a sampling location, and it is known that a technician that placed the monitoring device failed to properly prepare (e.g., failed to wear specialized clothing when placing an air particle counter) prior to entering the area or subarea in which the sampling location is located, the technician's failure to properly prepare can have introduced additional particles into the air that caused the excursion, which may be sufficient information for purposes of decision 436. In some examples, the error may be known based on comments entered by the technician or another person witnessing the technician's failure in association with the sampling location through the facility monitoring application. As another example, upon a malfunction of one or more components of the monitoring device (e.g., the air particle counter) when running a sample at a sampling location, the malfunction may be logged by the monitoring device and serve as information why an error occurred.

If at decision 436, information is determined to be available, the error or excursion can be documented along with the information at operation 438. Additionally, any remediation performed can be documented at operation 438. Continuing the above examples, remediation for the excursion can include running another sample at the sampling location after a predetermined period of time to ensure removal of the additional particles introduced by the technician, and ensuring the technician has properly prepared to enter the area or subarea before running the next sample. An example remediation for the error can include placing a new monitoring device at the sampling location to run a sample, and/or replacing or repairing the malfunctioning components of the monitoring device before re-running the sample at the sampling location.

Once the error and/or excursion, information for the error and/or excursion, and remediation are documented at operation 438, the method 420 can continue to operation 440, where trends in failures are determined. Example trends can be related to personnel errors, such as failure to prepare properly prior to entering sampling location area or subareas. Other example trends can be related to a particular air particle counter that is frequently malfunctioning. These trends can allow SOP administrators to identify common problems and remedy them to reduce the number of errors and/or excursions in the future. For example, if a trend in personnel errors is discovers, an SOP administrator may hold a mandatory training for all personnel. As another example, the SOP administrator can remove a monitoring device that is frequently malfunctioning from operation.

If at decision 436, no information is determined to be available for the error and/or excursion, non-compliance with the SOP is justified at operation 442. An example justification can be that no known or reported incidents occurred that could have caused the error or excursion. Once the non-compliance with the SOP is justified at operation 442, the method 420 ends at operation 432.

If at decision 434, no error and/or excursion is determined, then the method 420 can end at operation 432. In some examples, a report can be generated based on the analysis that includes whether or not sampling locations were missed, errors or excursions occurred at the sampling locations, and any of the justifications, documentation, and determined trends discussed above.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A facility monitoring system comprising:
a plurality of monitoring devices, each of the monitoring devices comprising:
a sensor configured to detect an environmental condition at a location in a facility;
a wireless transceiver configured to communicate with wireless transceivers of one or more other monitoring devices through a mesh network;
a memory storage device storing a database, the database including a standard operating procedure (SOP) of the facility and sample data based on the detected environmental condition; and
a processing device configured to:
analyze sample data based on the SOP to determine whether one or more of an error or an excursion occurred;
responsive to a determination that the error or the excursion has not occurred, capture new sample data;
store the sample data and the new sample data separately from previously synchronized data in the database while disconnected from at least one monitoring device of the plurality of monitoring devices;
responsive to reconnecting to the at least one monitoring device of the plurality of monitoring devices:
replicate, through a connection to the mesh network, the database including the stored separately sample data and the new sample data across the plurality of monitoring devices across the mesh network;
receive, through the connection to the mesh network, a transaction representing additional new data from the one or more other monitoring devices;
determine that the database does not include the transaction representing the additional new data; and
store the additional new data within the database.

2. The facility monitoring system according to claim 1, wherein at least one of the plurality of monitoring devices is an air particle counter and wherein the sensor is a particle sensor.

3. The facility monitoring system according to claim 1, wherein one or more of the plurality of monitoring devices are portable.

4. The facility monitoring system according to claim 2, wherein the mesh networking is IEEE 802.11s protocol.

5. The facility monitoring system according to claim 2, further comprising a remote computing device having a wireless transceiver configured to communicate with the wireless transceivers of one or more of the plurality of monitoring devices using the mesh networking.

6. The facility monitoring system according to claim 5, wherein one or more of the monitoring devices and the remote computing device include a display through which one or more of a sampling user interface and a dashboard user interface are presented.

7. The facility monitoring system according to claim 2, wherein in response to a monitoring device receiving an update to the SOP, the update to the SOP is stored in the database of the monitoring device, and the processing device of the monitoring devices is configured to replicate the database across the plurality of monitoring devices using the mesh networking.

8. The facility monitoring system according to claim 2, wherein in response to a monitoring device being isolated from the mesh networking when one or more of the sensor of the monitoring device detects the environmental condition and an update to the SOP is received:

one or more of the sample data based on the detected environmental condition and the update to the SOP is stored in the database of the monitoring device; and upon reconnecting with the mesh networking, the processing device of the monitoring device is configured to replicate the database across the plurality of monitoring devices using the mesh networking, to distribute one or more of the sample data and the update to the SOP to the other monitoring devices.

9. An air particle counter comprising:

a particle sensor configured to detect particles within a sample captured at a location where the air particle counter is positioned within a facility;

a wireless transceiver configured to facilitate database replication across one or more other air particle counters within the facility using mesh networking;

a processor coupled to the particle sensor and the wireless transceiver; and a memory storage device coupled to the processor, wherein the memory storage device stores instructions that, when executed by the processor, causes the processor to:

based on a standard operating procedure (SOP) adopted by the facility, run the sample at the location using the particle sensor to generate a particle count for the location based on the particles detected by the particle sensor;

analyze sample data based on the SOP to determine whether one or more of an error or an excursion occurred;

responsive to a determination that the error or the excursion has not occurred, capture new sample data;

store the sample data and the new sample data separately from previously synchronized data in a database of the memory storage device while disconnected from at least one air particle counter of the one or more other air particle counters, the sample data including the particle count;

responsive to reconnecting to the at least one air particle counter of the one or more other air particle counters:

replicate, through a connection to the mesh network, the database including the stored separately sample data and the new sample data across the one or more other air particle counters across the mesh network;

receive, through the connection to the mesh network, a transaction representing new data from the one or more other air particle counters;

determine that the database does not include the transaction representing the new data; and store the new data within the database.

10. The air particle counter according to claim 9, wherein the air particle counter is portable.

11. The air particle counter according to claim 9, wherein the air particle counter further comprises an isokinetic probe that captures the sample at the location where the air particle counter is positioned.

12. The air particle counter according to claim 11, wherein the isokinetic probe is one of portable or fixed at the location.

13. The air particle counter according to claim 11, wherein the air particle counter further comprises:

an air pump configured to draw in the sample from the isokinetic probe and advance the sample through the particle sensor.

14. The air particle counter according to claim 13, wherein the air particle counter further comprises:

a mass flow sensor configured to determine a flow rate of the sample as it is drawn in and advanced through the air particle counter by the air pump, wherein the processor is further caused to transmit a control signal to the air pump to adjust the flow rate of the sample based on the flow rate determined by the mass flow sensor and a desired flow rate.

15. The air particle counter according to claim 9, wherein the air particle counter further comprises sensors to detect one or more of a temperature, a relative humidity, and an absolute pressure of the sample, and the sample data further includes the one or more of the temperature, the relative humidity, and the absolute pressure of the sample.

16. The air particle counter according to claim 9, wherein the air particle counter includes a display, and the processor is further caused to:

provide, through the display, one or more of a dashboard user interface that facilitates SOP management and a sampling user interface that facilitates running of the sample at the location.

17. The air particle counter according to claim 9, wherein the air particle counter includes a display, and the processor is further caused to:

provide, through the display, an alert in response to detecting one or more of a second error during sampling or upon a determination that the particle count for the location exceeds particle count limits set for the location by the SOP.

18. A method performed by an air particle counter, the method comprising:

configuring a standard operating procedure (SOP) adopted by a facility;

running a sample at a location within the facility based on the SOP to collect sample data;

analyzing the sample data based on the SOP to determine whether one or more of an error or an excursion occurred while the sample was running;

responsive to a determination that the error or the excursion has not occurred, capture sample data;

storing the sample data and the new sample data separately from previously synchronized data in a database of the air particle counter while disconnected from at least one other air particle counter of one or more other air particle counters, the sample data and the new sample data including a particle count for the location;

responsive to reconnecting to the at least one other air particle counter of the one or more other air particle counters:

replicating, through a connection to a mesh network, the database including the stored separately sample data and new sample data across the one or more other air particle counters within the facility;

receiving, through the connection to the mesh network, a transaction representing new data from the one or more other air particle counters;

determining that the database does not include the transaction representing the new data; and storing the new data within the database.

19. The method according to claim 18, further comprising:

receiving an updated SOP;

storing the updated SOP in the database; and replicating the database across the one or more other air particle counters within the facility using the mesh networking.

20. The method according to claim 18, further comprising:

receiving sample data for samples run by and updated SOP received at the one or more other air particle counters using the mesh networking; and storing the sample data for the samples run by and the updated SOP received at the one or more other air particle counters in the database of the air particle counter.

21. The method according to claim 18, wherein configuring the SOP comprises:

receiving the SOP, wherein the SOP includes a plurality of locations to be sampled within the facility, particle count limits for each location, and processes for collecting samples at each location; and generating for display a dashboard user interface that displays a representation of the SOP and a compliance status associated with the SOP.

22. The method according to claim 21, wherein generating for display the dashboard user interface comprises representing the SOP hierarchically to include:

a high level representation displaying one or more areas of the facility to which the SOP is applicable, an intermediate level representation displaying one or more subareas of each of the one or more areas displayed in the high level representation, and a low level representation displaying locations to be sampled within each of the one or more subareas displayed in the intermediate level representation.

23. The method according to claim 22, further comprising:

applying a graphical scheme to each location within the low level representation of the dashboard user interface to indicate the compliance status associated with the SOP; and rolling up the graphical scheme from the low level representation to the intermediate level representation and the high level representation.

24. The method according to claim 23, further comprising:

running the sample at the location in response to the graphical scheme applied to the location indicating the sample is to be run at the location to maintain SOP compliance;

updating the dashboard user interface upon completion of the sample to include at least a date and a time the sample was run at the location and a result of the sample within the low level representation; and modifying the graphical scheme applied to the location based on the result.

25. The method according to claim 18, further comprising:

verifying the location at which the sample is being run based on one or more of:

scanning of a machine-readable code fixed at the location, employing a global positional system (GPS), or employing a land navigation system.

26. The method according to claim 18, further comprising:

generating a report based on the analysis of the sample data.

* * * * *